(12) United States Patent
Zhang et al.

(10) Patent No.: US 10,477,437 B2
(45) Date of Patent: Nov. 12, 2019

(54) NODE-SPECIFIC MEDIUM RESERVATION FOR SPECTRUM SHARING

(71) Applicant: QUALCOMM Incorporated, San Diego, CA (US)

(72) Inventors: Xiaoxia Zhang, San Diego, CA (US); Tamer Kadous, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/883,237

(22) Filed: Jan. 30, 2018

(65) Prior Publication Data

US 2018/0249380 A1   Aug. 30, 2018

Related U.S. Application Data

(60) Provisional application No. 62/464,239, filed on Feb. 27, 2017.

(51) Int. Cl.
*H04W 28/26* (2009.01)
*H04W 8/24* (2009.01)
(Continued)

(52) U.S. Cl.
CPC ............. *H04W 28/26* (2013.01); *H04W 8/24* (2013.01); *H04W 16/14* (2013.01); *H04W 28/12* (2013.01);
(Continued)

(58) Field of Classification Search
CPC .................. H04B 7/2121; H04B 7/2123; H04J 2203/0069; H04Q 2213/394; H04W 72/04;
(Continued)

(56) References Cited

U.S. PATENT DOCUMENTS 7,864,796 B1 * 1/2011 Benveniste ........... H04W 28/26
                                                370/230
9,693,367 B2 * 6/2017 Fang ................ H04W 74/0816
(Continued)

FOREIGN PATENT DOCUMENTS

WO    WO-2017065875 A1    4/2017

OTHER PUBLICATIONS

International Search Report and Written Opinion—PCT/US2018/016160—ISA/EPO—dated Apr. 30, 2018.

*Primary Examiner* — Sharad Rampuria
(74) *Attorney, Agent, or Firm* — Haynes and Boone, LLP

(57) ABSTRACT

Wireless communications systems and methods related to sharing a spectrum using node-specific medium reservation signals are provided. A first wireless communication device a first configuration designated to the first wireless communication device. The first configuration indicates at least one waveform for representing reservation information. The first wireless communication device transmits a reservation signal to reserve a transmission opportunity (TXOP) in a shared spectrum. The reservation signal includes a first waveform representing corresponding first reservation information based on the first configuration. The first waveform is associated with a root sequence and a cyclic-shift value. The first reservation information indicates a transmit power level of the reservation signal. The first reservation information indicates an interference tolerance level of the first wireless communication device. The first reservation information indicates a reserved duration within the TXOP.

27 Claims, 13 Drawing Sheets

(51) Int. Cl.
    *H04W 16/14* (2009.01)
    *H04W 72/04* (2009.01)
    *H04W 28/12* (2009.01)
    *H04W 74/08* (2009.01)

(52) U.S. Cl.
    CPC ... *H04W 72/0453* (2013.01); *H04W 74/0816* (2013.01)

(58) Field of Classification Search
    CPC ..... H04W 72/12; H04W 76/00; H04W 28/26; H04W 74/0875; H04W 28/12; H04W 72/0453; H04W 8/24; H04W 16/14
    See application file for complete search history.

(56) References Cited

U.S. PATENT DOCUMENTS

| | | |
|---|---|---|
| 9,942,901 B2 * | 4/2018 | Chandrasekhar ............................ H04W 72/0453 |
| 2016/0345206 A1 | 11/2016 | Yerramalli et al. |
| 2018/0184463 A1 * | 6/2018 | Fakoorian ............. H04W 16/14 |

* cited by examiner

NODE-SPECIFIC MEDIUM RESERVATION FOR SPECTRUM SHARING

CROSS REFERENCE TO RELATED APPLICATIONS

The present application claims priority to and the benefit of the U.S. Provisional Patent Application No. 62/464,239, filed Feb. 27, 2017, which is hereby incorporated by reference in its entirety as if fully set forth below and for all applicable purposes.

TECHNICAL FIELD

This application relates to wireless communication systems, and more particularly to improving spectrum sharing among multiple network operating entities by using node-specific medium reservation mechanisms.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

An approach to sharing a spectrum is to employ a priority-based coordinated access scheme. In the priority-based coordinated access scheme, a shared spectrum is partitioned into multiple time periods. Each time period is designated for a particular type of access. For example, a time period can be allocated to a particular network operator for exclusive access of the shared spectrum, where no reservation from the particular network operator is required. Alternatively, a time period can be shared among multiple network operators on a priority basis with reservations. For example, a high priority network operator may have priority or guaranteed access of the shared spectrum in a time period, but requires a prior reservation of the time period. When the high priority network operator does not reserve the time period, a low priority network operator can opportunistically access the shared spectrum in the time period.

A reservation may include a reservation request (RRQ) signal and a reservation response (RRS) signal. For example, a BS of a high priority operator may transmit an RRQ signal to indicate a reservation and a transmission schedule for the time period. A target receiver may respond to the RRQ signal by transmitting an RRS signal. A low priority operator may monitor for an RRQ signal and/or an RRS signal from a high priority operator. Upon detection of an RRQ signal and/or an RRS signal, the low priority operator may yield spectrum access to the high priority operator. As such, the signaling of the RRS signal can protect data receptions at the target receiver from low priority operator nodes close to the target receiver.

One approach to reducing resource overhead and to reduce monitoring complexity is to allow all target receivers to transmit RRS signals on the same resource. However, in such an approach, a monitoring node may detect a sum of the RRS signals and may not be able to differentiate the different RRS signals from the different transmitting nodes. Thus, RRS signals cannot carry node-specific reservation information. In addition, the sum of the RRS signals can result in a strong signal strength at the monitoring node and causes the monitoring node to yield unnecessarily. Accordingly, improved procedures for RRS signal transmission and detection may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising obtaining, by a first wireless communication device, a first configuration designated to the first wireless communication device, wherein the first configuration indicates at least one waveform for representing reservation information; and transmitting, by the first wireless communication device, a reservation signal to reserve a transmission opportunity (TXOP) in a shared spectrum, wherein the reservation signal includes a first waveform representing corresponding first reservation information based on the first configuration.

In an additional aspect of the disclosure, an apparatus comprising a processor configured to obtain a first configuration designated to the apparatus, wherein the first configuration indicates at least one waveform for representing reservation information; and a transceiver configured to transmit a reservation signal to reserve a transmission opportunity (TXOP) in a shared spectrum, wherein the reservation signal includes a first waveform representing corresponding first reservation information based on the first configuration.

In an additional aspect of the disclosure, a computer-readable medium having program code recorded thereon, the program code comprising code for causing a first wireless communication device to obtain a first configuration designated to the first wireless communication device, wherein the first configuration indicates at least one waveform for representing reservation information; and code for causing the first wireless communication device to transmit a reservation signal to reserve a transmission opportunity (TXOP) in a shared spectrum, wherein the reservation signal includes a first waveform representing corresponding first reservation information based on the first configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
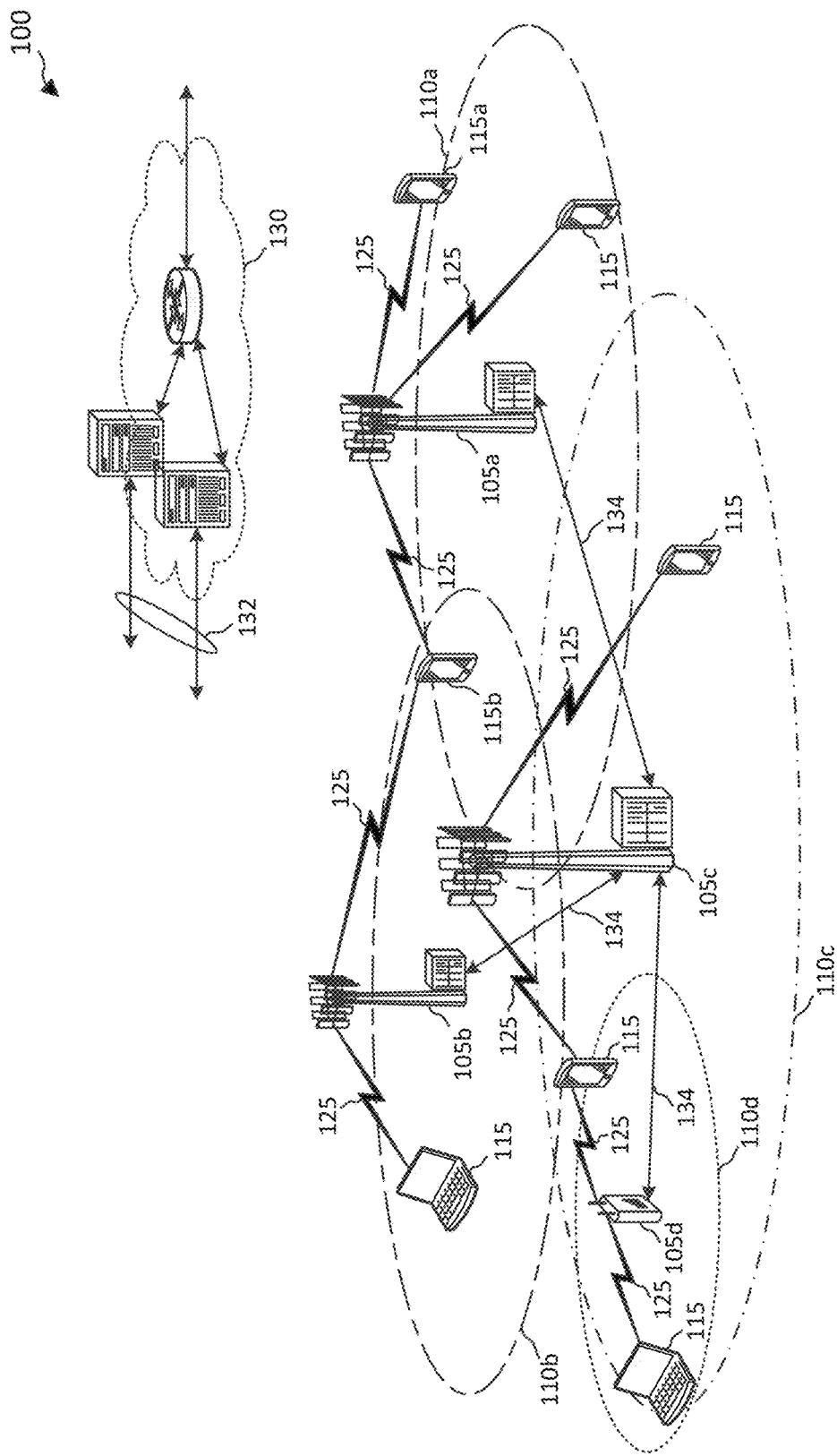
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for improving spectrum sharing among multiple network operating entities by employing node-specific reservation signals to indicate node-specific signaling or reservation information. In a priority-based spectrum sharing scheme, a spectrum is time-partitioned into transmission opportunities (TXOPs). Each TXOP is designated for prioritized use by a prioritized or high priority network operating entity and opportunistic use by low priority network operating entities based on reservations. For example, a granting BS can transmit a reservation request (RRQ) signal to reserve a TXOP. A target receiver can transmit an RRS signal to silence low priority nodes around the target receiver. A low priority node can listen to the channel and yield based on RRQ and RRS signal detections. The disclosed embodiments employ node-specific RRS signals to enable multiple target receivers to communicate node-specific reservation. The node-specific RRS signals can include particular waveforms representing corresponding reservation information. The waveforms can be orthogonal waveforms so that multiple nodes or target receivers can transmit node-specific RRS signals on the same resource and a monitoring node can detect and differentiate the different node-specific RRS signals from the same resource. In an embodiment, the orthogonal waveforms are cyclically-shifted root sequences. For example, each node may be assigned with multiple RRS configurations, each including a root sequence index, a cyclic-shift value, and a transmission resource for representing particular node-specific reservation information.

Aspects of the present disclosure can provide several benefits. For example, the use of orthogonal waveforms for node-specific RRS signals allows resource reuse and yet maintaining low monitoring complexity. The signal differentiation provided by the orthogonal waveforms enable a monitoring node to make better yielding decision based on each received waveform. The communication of node-specific reservation information can further improve spectrum sharing efficiency.

In one embodiment, an RRS transmitting node can indicate an RRS signal transmission power level and/or an interference tolerance level of the target receiver in the node-specific reservation information via a particular waveform. A monitoring node can make a better yielding decision based on the RRS signal transmission power level and/or the interference tolerance level. For example, the monitoring node can reduce its transmission power level based on the received RRS signal transmission level and/or the interference tolerance level instead of yielding. Thus, the disclosed embodiments can improve spectrum reuse.

In another embodiment, a target receiver can indicate a reserved duration in the node-specific reservation information via a particular waveform. For example, a target receiver may be scheduled to communicate with a target transmitter during a portion of the TXOP. To reduce complexity, the reserved duration can be expressed in some predetermined units (e.g., 1 millisecond (ms), 2 ms, 3 ms, 4 ms, and/or 5 ms). Thus, a low priority node can reclaim the remaining portion of the TXOP for communication. As such, the disclosed embodiments can improve resource utilization efficiency.

In another embodiment, the use of the orthogonal waveforms enables a granting BS to distinguish the different node-specific RRS signals transmitted by the different scheduling UEs or nodes. Thus, the node-specific RRS signals can function as clear-to-send (CTS) signals to enable the scheduling nodes to inform the granting BS whether communication can proceed as scheduled.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
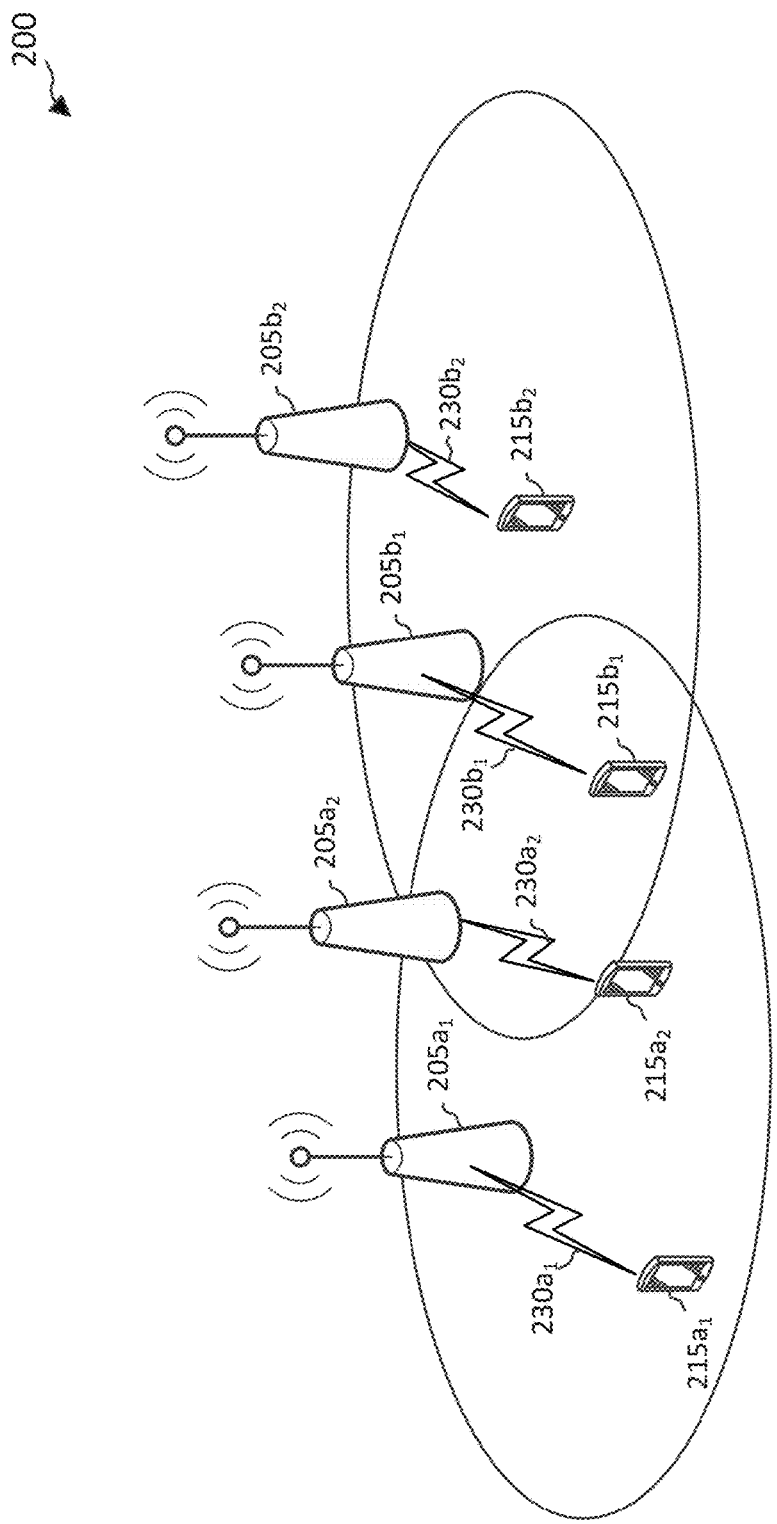
FIG. 2 illustrates an example of a wireless communications network that supports spectrum sharing with dynamic time-division duplexing (TDD) according to embodiments of the present disclosure.

FIG. 2 illustrates an example of a wireless communications network 200 that supports spectrum sharing with dynamic TDD according to embodiments of the present disclosure. The network 200 may be similar to the network 100. FIG. 2 illustrates four BSs 205 and four UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The network 200 may be operated by multiple operators sharing a frequency spectrum. For example, Operator A may operate the BSs 205a and the UEs 215a, and Operator B may operate the BSs 205b and the UEs 215b.

The sharing of the frequency spectrum may be based on priorities and reservations. A shared spectrum can be time-partitioned into multiple periods. Each operator may be assigned with an access priority in each period. In addition, each link (e.g., a UL or a DL) within an operator may be assigned with an access priority in each period. The BSs 205 and the UEs 215 may communicate with each other in a period according to a corresponding operator priority and a corresponding link priority.

As an example, the BS $205a_1$ may serve the UE $215a_1$ in a DL direction over a link $230a_1$ in the shared spectrum during a first time period. The BS $205a_2$ may serve the UE $215a_2$ in a UL direction over a link $230a_2$ in the shared spectrum during a second time period. The BS $205b_1$ may serve the UE $215b_1$ in a DL direction over a link $230b_1$ in the shared spectrum during a third time period. The BS $205b_2$ may serve the UE $215b_2$ in a UL direction over a link $230b_2$ in the shared spectrum during a fourth time period. In some embodiments, some of the first, second, third, and fourth time periods can be the same time period based on interference among the BSs 205 and the UEs 215. For example, the DL transmission over the link $230a_1$ and the UL transmission over the link $230b_2$ may occur without causing significant interference to each other. The sharing mechanisms are described in greater detail herein.

Figure 3:
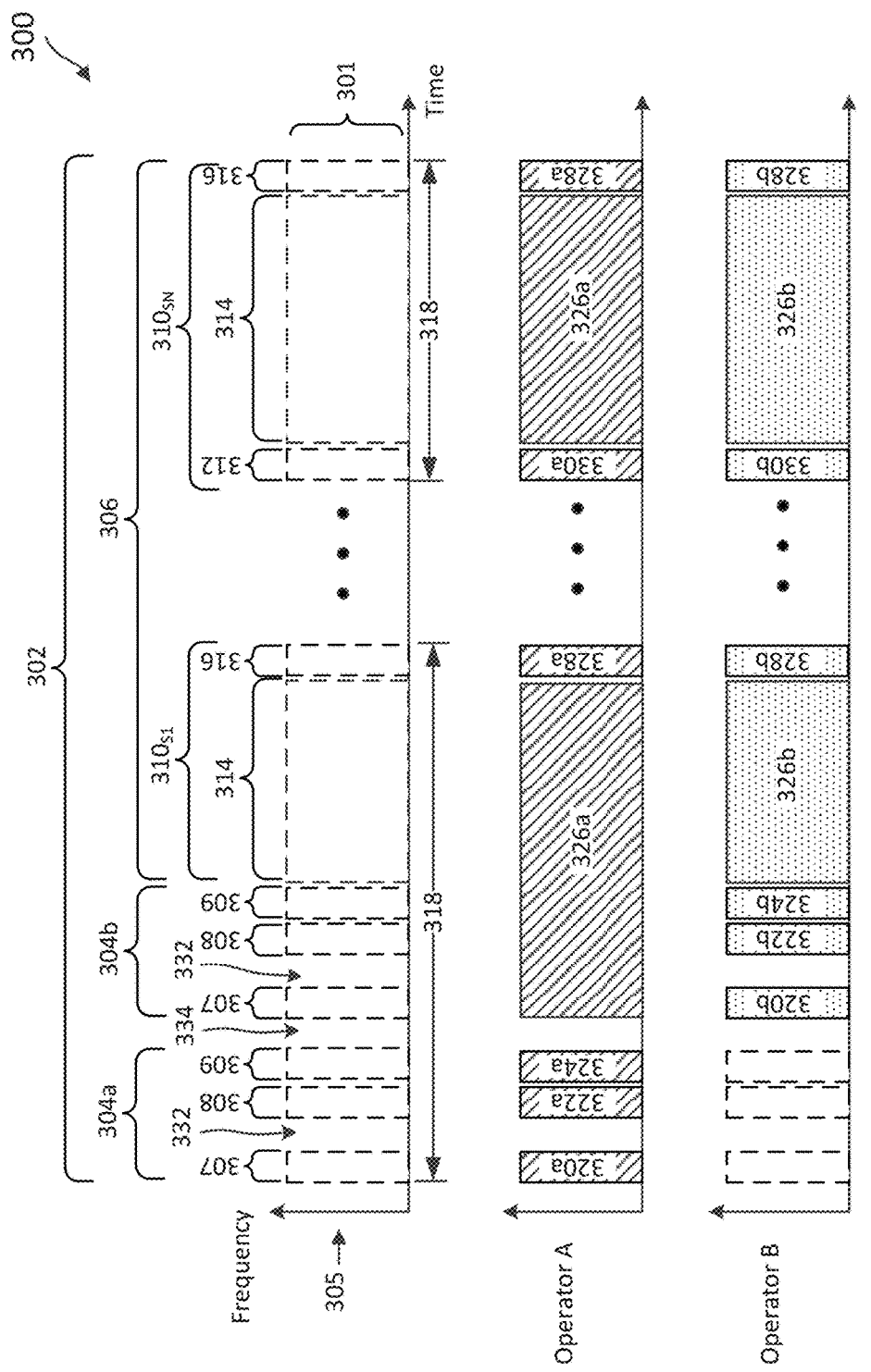
FIG. 3 illustrates a coordinated priority-based spectrum sharing scheme with interference management according to embodiments of the present disclosure.

FIG. 3 illustrates a coordinated priority-based spectrum sharing scheme 300 with interference management according to embodiments of the present disclosure. The x-axes represent time in some constant units. The y-axes represent frequency in some constant units. The scheme 300 may be employed by the BSs 105 and 205 and the UEs 115 and 215 to access a shared spectrum 301. While the scheme 300 illustrates coordinated spectrum access for two different network operating entities (e.g., Operator A and Operator B), the scheme 300 can be applied to any suitable number of network operating entities.

In the scheme 300, the spectrum 301 is time-partitioned into a plurality of transmit opportunities (TXOPs) 302 as shown in the frame structure 305. The TXOPs 302 may have a fixed duration and may be defined in units of OFDM symbols, subframes, slots, and/or any suitable time format. Each TXOP 302 includes a plurality of channel sensing or clear channel assessment (CCA) periods 304 followed by a transmission period 306. The CCA periods 304 are separated by a gap period 334. The structure 305 of the TXOP 302 is predetermined and known by all network operating entities sharing the shared spectrum. The network operating entities may be time-synchronized when operating in the shared spectrum 301.

Each CCA period 304 is assigned to a particular network operating entity (e.g., Operator A or Operator B). The assigned network operating entity may transmit a reservation in the CCA period 304 to reserve the following transmission period 306. Each CCA period 304 includes portions 307, 308, and 309. The portions 307 and 308 are separated by a gap period 332. The portions 307 are used for transmitting RRQ signals 320. Each RRQ signal 320 may include a predetermined preamble sequence, a request-to-send (RTS) signal, and/or transmission triggers (e.g., scheduling information). The portions 308 are used for transmitting RRS signals 322 for operator-level sharing (e.g., across operators). The portions 309 are used for transmitting RRS signals 324 for link-level sharing (e.g., between UL and DL) within an operator. Each of the RRS signals 322 and 324 may include a predetermined preamble sequence or a clear-to-send (CTS) signal. The CCA periods 304 can be arranged in a decreasing order of priorities. Thus, a low priority operator node can monitor the channel (e.g., the shared spectrum 301) in the CCA periods 304 of higher priorities. Upon detection of a reservation from a high priority operator node, the low priority operator node may refrain from transmitting in the following transmission period 306. The gap period 334 allows low priority operator nodes to process the reservation of a higher priority operator. The gap period 332 allows for switching between UL and DL processing.

The transmission period 306 includes a plurality of sub-periods 310 shown as $310_{S1}$ to $310_{SN}$. The first sub-period $310_{S1}$ includes portions 314 and 316. The remaining sub-periods 310 in the transmission period 306 include portions 312, 314, and 316. The portions 312 are used for transmitting DL controls 330 (e.g., UL or DL triggers) for corresponding portions 314. The portions 314 are used for transmitting UL or DL data 326 based on corresponding triggers. The portions 316 are used for transmitting UL controls 328, such as scheduling request (SR) and hybrid automatic repeat request (HARQ) information. In an embodiment, the TXOP 302 is divided into a number of slots 318. The first slot 318 includes the CCA periods 304 and the sub-period $310_{S1}$. The remaining slots 318 correspond to the remaining sub-periods 310.

As an example, Operator A has priority over Operator B in the particular TXOP 302. As such, the high-priority CCA period 304a is assigned to Operator A and the low-priority CCA period 304b is assigned to Operator B. Thus, Operator A nodes has prioritized access in the transmission period 306, while Operator B nodes may opportunistically access the transmission period 306 when the transmission period 306 is not reserved by Operator A nodes. In addition, the default link direction is DL within Operator A and within Operator B during the TOXP 302. Thus, the transmission priorities in order are Operator A DL, Operator A UL, Operator B DL, and Operator B UL. The patterned boxes represent signal transmissions. The dashed boxes are included as references to the TXOP structure 305 without signal transmission.

For prioritized access, a DL-granting BS of Operator A may transmit an RRQ signal 320a in the portion 307 of the CCA period 304a to reserve the following transmission period 306. The RRQ signal 320a may include a DL trigger. For dynamic TDD within Operator A, a UL-granting BS of Operator A may transmit an RRQ signal 320a including a UL trigger in the same portion 307 of the CCA period 304a based on reuse one. Operator A triggered nodes may transmit an RRS signal 322a in the portion 308 of the CCA period 304a to silence Operator B nodes (e.g., low priority operator). Operator B nodes may monitor the CCA period 304a for an RRQ signal 320a and/or an RRS signal 322a from Operator A. Upon detection of the RRQ signal 320a and/or the RRS signal 322a, Operator B nodes may yield spectrum access to Operator A.

A DL-triggered UE (e.g., the target receiver) may transmit an RRS signal 324a in the portion 309 of the CCA period 304a to silence Operator A nodes of a lower link priority (e.g., UL). Subsequently, the DL-granting BS may transmit data 326a to the DL-triggered UE in the portion 314 of the sub-period $310_{S1}$. The DL-triggered UE may transmit UL control 328a in the portion 316 of the sub-period $310_{S1}$. In subsequent sub-periods 310, the DL-granting BS may trigger one or more other UEs for DL communications. In some embodiments, the transmission period 306 may begin after the CCA period 304a (e.g., occupying the low-priority CCA period 304b).

The UL-triggered UE may monitor for an RRS signal 324a in the portion 309 of the CCA period 304a. When no RRS signal 324a is detected, the UL-triggered UE may dynamically switch the link priority to UL and transmit data 326a and a UL control 328a to the UL-granting BS during the portions 314 and 316, respectively, of the sub-period $310_{S1}$. When there are lower priority operator nodes, the UL-granting BS (e.g., the target receiver) may transmit an RRS signal 322a during the portion 309 of the CCA period 304a to silence low priority nodes near the UL-granting BS. In subsequent sub-periods 310, the UL-granting BS may trigger one or more other UEs for UL communications. While the dynamic TDD mechanisms are described in the context of switching a link priority from DL to UL, similar mechanisms can be applied to a link priority from UL to DL.

When the shared spectrum 301 is not reserved by Operator A, Operator B can opportunistically access the TXOP 302 using similar mechanisms as Operator A. For example, a UL-granting BS and/or a DL-granting BSs of Operator B may transmit RRQ signals 320b in the portion 307 of the assigned CCA period 304b to trigger DL and/or UL communications of data 326b. Operator B triggered nodes can transmit an RRS signal 322b in the portion 308 of the CCA period 304b when there are lower priority operator. A DL-triggered UE can transmit an RRS signal 324b in the portion 309 of the CCA period 304b. Subsequently, the DL-granting BS can transmit data 326b to the DL-triggered UE in the portion 314 of the sub-period $310_{S1}$. The DL-triggered UE can transmit UL control 328b in the portion 316 of the sub-period $310_{S1}$. To switch the link priority from the default link priority, the UL-triggered UE may monitor for an RRS signal 324b in the portion 309. When no RRS signal 324b is detected, the UL-triggered UE may transmit data 326b and a UL control 328b to the UL-granting BS during the portions 314 and 316, respectively, of the sub-period $310_{S1}$.

Figure 4:
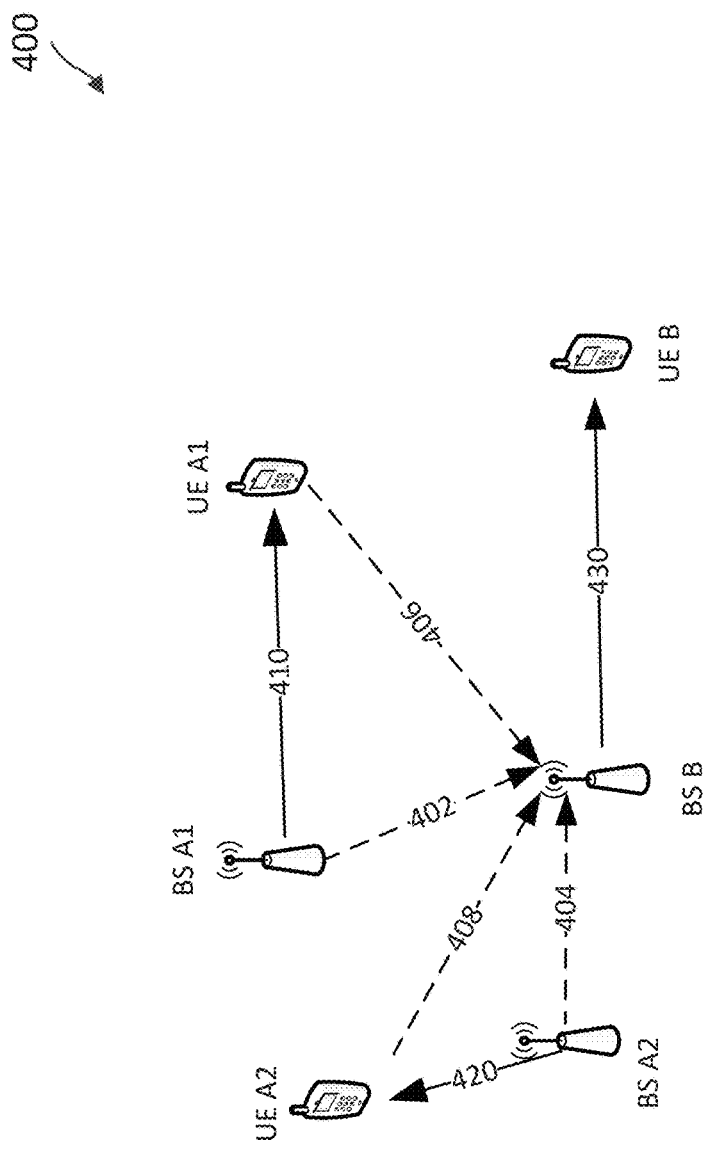
FIG. 4 illustrates a spectrum sharing scenario with interference management according to embodiments of the present disclosure.

FIG. 4 illustrates a spectrum sharing scenario 400 with interference management in a network such as the networks 100 and 200 according to embodiments of the present disclosure. In the scenario 400, a BS A1 serves a UE A1, a BS A2 serves a UE A2, and a BS B serves a UE B. The BSs A1, A2, and B may be similar to the BSs 105 and 205. The UEs A1, A2, and B may be similar to the UEs 115 and 215. The BSs A1 and A2 and the UEs A1 and A2 may be operated by Operator A, while the BS B and the UE B may be operated by Operator B. In a particular TXOP (e.g., the TXOP 302), Operator A may have priority over Operator B. The BSs A1, A2, and B and the UEs A1, A2, and B may employ similar reservation, scheduling, and monitoring mechanisms as described in the scheme 300.

The BS A1 may reserve the TXOP in a shared spectrum (e.g., the spectrum 301) for a DL communication with the UE A1 as shown by the arrow 410. The BS A2 may reserve the TXOP for a DL communication with the UE A2 as shown by the arrow 420. To silence low priority nodes (e.g., the Operator B nodes), the BS A1, the BS B2, the UE A1, and the UE A3 may simultaneously transmit RRS signals 402, 404, 406, and 408 (e.g., the RRS signals 322) on the same resource (e.g., in the portion 308 of the CCA period 304a), respectively. The BS B may monitor the shared spectrum to determine whether the BS B may reserve the TXOP for a DL communication with the UE B as shown by the arrow 430.

As an example, the BSs A1 and A2 and the UEs A1 and A2 may be positioned at locations far away from the BS B and the transmission from each of the BSs A1 and A2. Thus, each of the RRS signals 402, 404, 406, and 408 may have a weak received signal strength at the BS B. As such, a transmission from the BS B may not cause significant interference to the UEs A1 and A2 (e.g., the target receivers). However, the BS B may not be able to determine the number of RRS signals received and/or differentiate the different RRS signals transmitted by the different nodes due to the simultaneous RRS transmissions on the same resource. The BS B may receive a sum of the RRS signals 402, 404, 406, and 408, where the combined signal strength may be high, and thus the BS B may yield unnecessarily. Thus, RRS signal transmissions based on reuse can cause resource underutilization and may not carry node-specific signaling information. In addition, RRS signals cannot function as CTS signals to facilitate scheduling or communication by the scheduling BSs, as described in greater detail herein.

Figure 5:
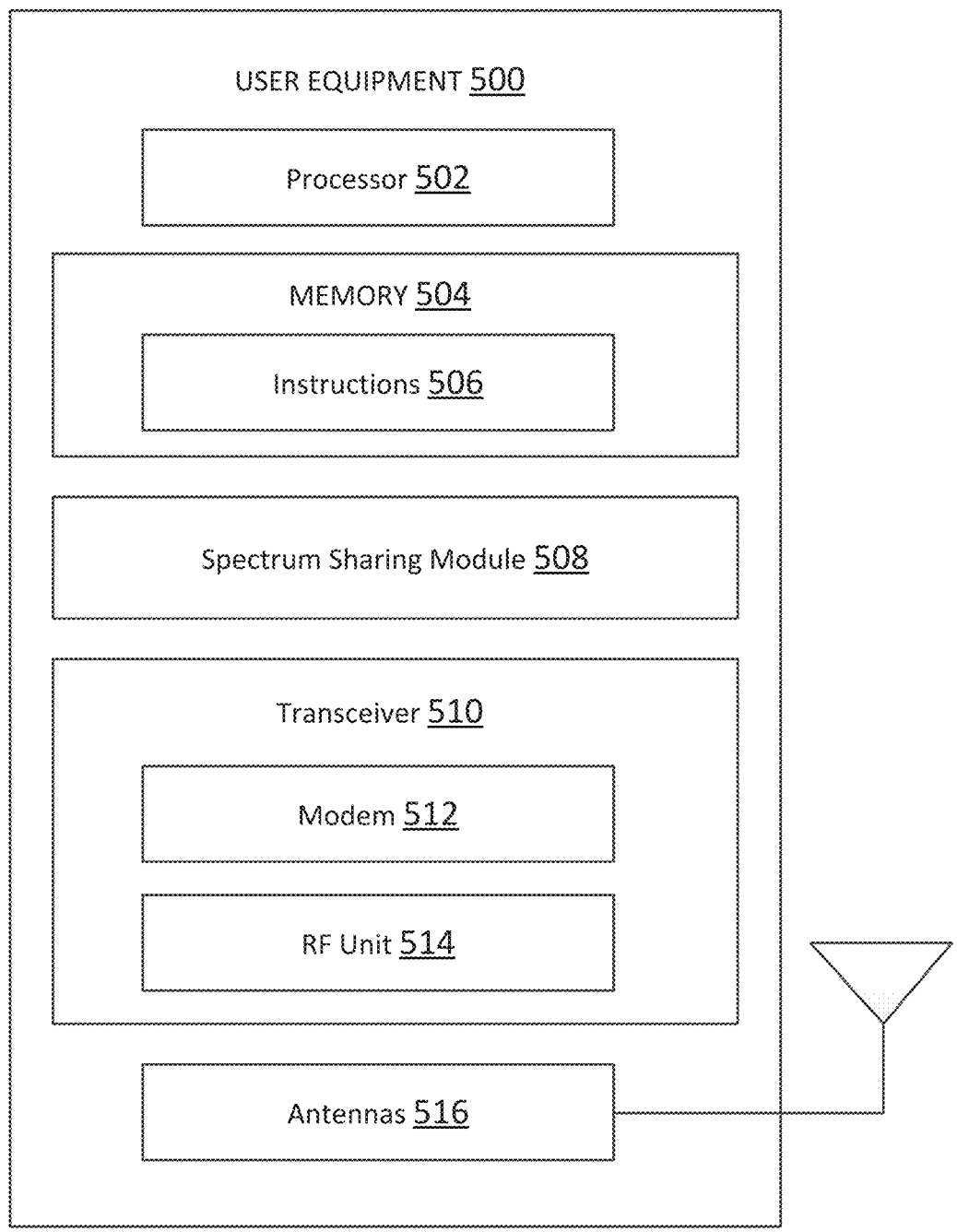
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 115 or 215 as discussed above. As shown, the UE 500 may include a processor 502, a memory 504, a spectrum sharing module 508, a transceiver 510 including a modem subsystem 512 and a radio frequency (RF) unit 514, and an antenna 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 215 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The spectrum sharing module 508 may be used for various aspects of the present disclosure. For example, the spectrum sharing module 508 is configured to identify TXOPs in a shared spectrum, perform network listening, reserve time periods for communication, transmit RRS signals with node-specific signaling, and/or determine channel yielding based on node-specific RRS signals from other nodes, as described in greater detail herein.

As shown, the transceiver 510 may include the modem subsystem 512 and the RF unit 514. The transceiver 510 can be configured to communicate bi-directionally with other devices, such as the BSs 105 and 205. The modem subsystem 512 may be configured to modulate and/or encode the data from the memory 504 and/or the spectrum sharing module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215 or a BS 205. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 215 to enable the UE 215 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of clear-to-send (CTS) signals according to embodiments of the present disclosure. The antenna 516 may further receive data messages transmitted from other devices. This may include, for example, reception of request-to-send (RTS) and/or CTS signals according to embodiments of the present disclosure. The antenna 516 may provide the received data messages for processing and/or demodulation at the transceiver 510. Although FIG. 5 illustrates antenna 516 as a single antenna, antenna 516 may include multiple antennas of similar or different designs in order to sustain multiple transmission links. The RF unit 514 may configure the antenna 516.

Figure 6:
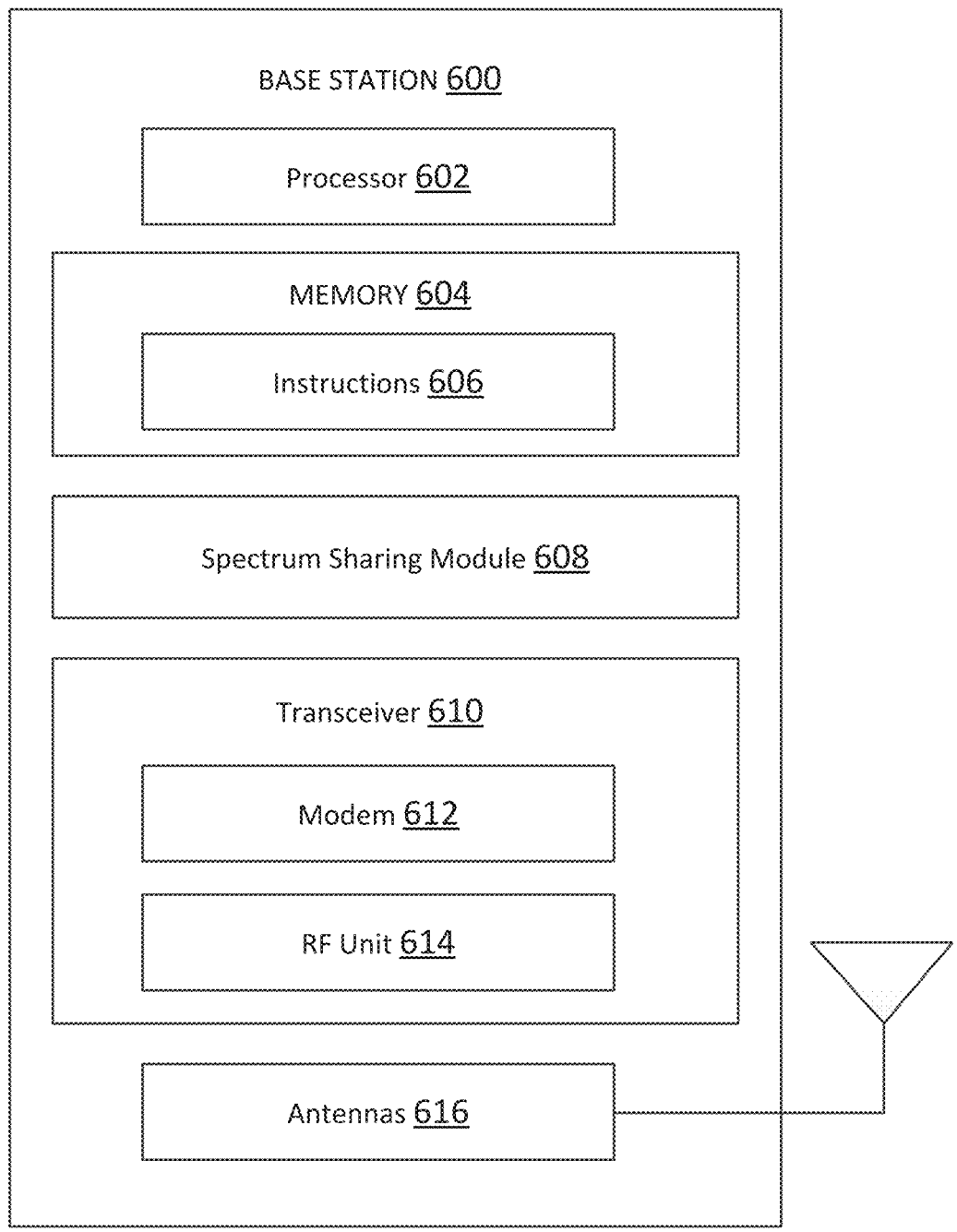
FIG. 6 is a block diagram of an exemplary base station (BS) according to embodiments of the present disclosure.

FIG. 6 is a block diagram of an exemplary BS 600 according to embodiments of the present disclosure. The BS 600 may be a BS 105 or 205 as discussed above. A shown, the BS 600 may include a processor 602, a memory 604, a spectrum sharing module 608, a transceiver 610 including a modem subsystem 612 and a RF unit 614, and an antenna 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6.

The spectrum sharing module 608 may be used for various aspects of the present disclosure. For example, the spectrum sharing module 608 is configured to identify TXOPs in a shared spectrum, perform network listening, reserve time periods for communication, transmit RRS signals with node-specific signaling, determine scheduling based on node-specific RRS signals from serving UEs, and/or determine channel yielding based on node-specific RRS signals from other nodes, as described in greater detail herein.

As shown, the transceiver 610 may include the modem subsystem 612 and the RF unit 614. The transceiver 610 can be configured to communicate bi-directionally with other devices, such as the UEs 115 and 215 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 215. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 205 to enable the BS 205 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of information to complete attachment to a network and communication with a camped UE 215 according to embodiments of the present disclosure. The antenna 616 may further receive data messages transmitted from other devices and provide the received data messages for processing and/or demodulation at the transceiver 610. Although FIG. 6 illustrates antenna 616 as a single antenna, antenna 616 may include multiple antennas of similar or different designs in order to sustain multiple transmission links.

Figure 7:
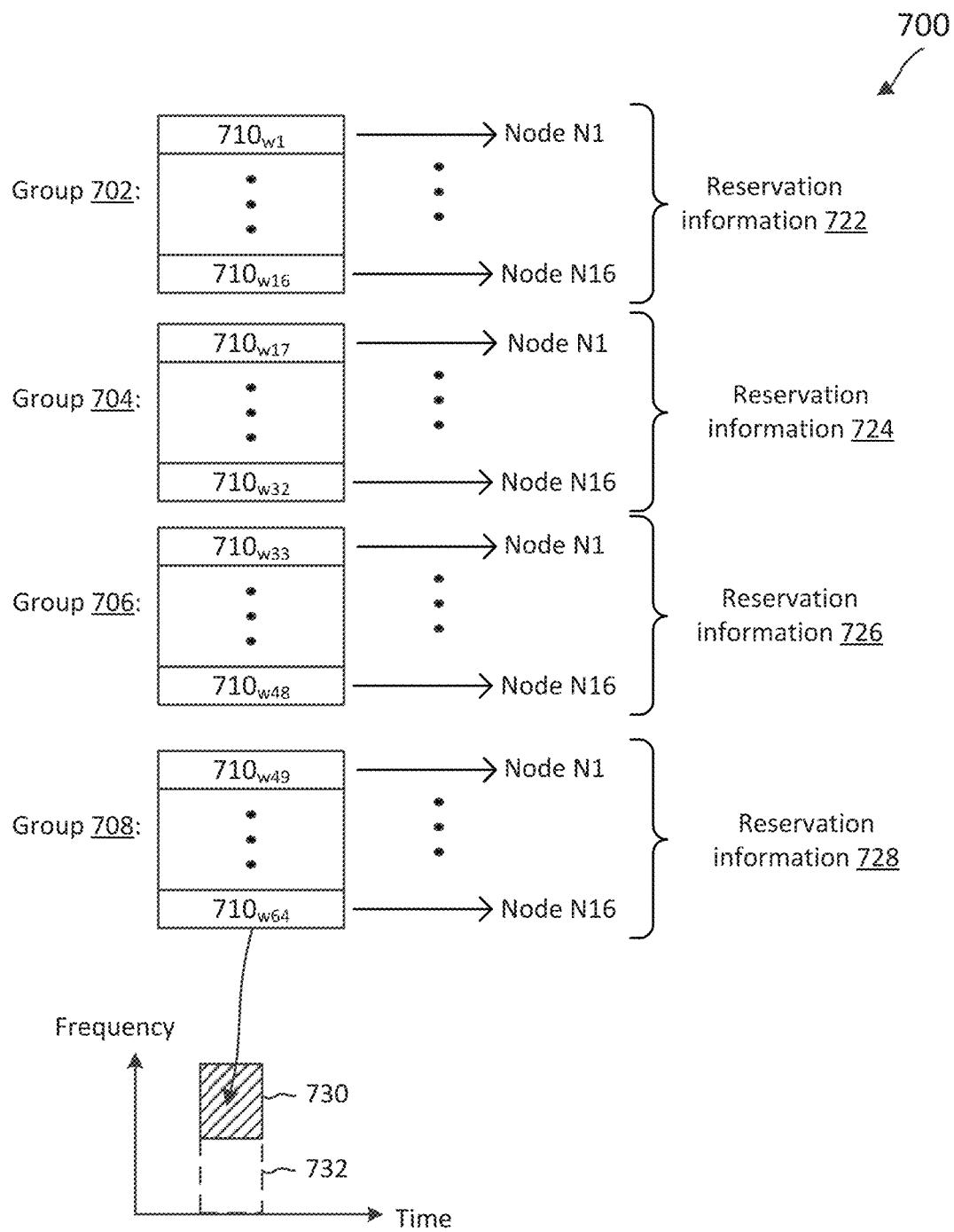
FIG. 7 illustrates a node-specific reservation response (RRS) signal transmission scheme according to embodiments of the present disclosure.
Figure 8:
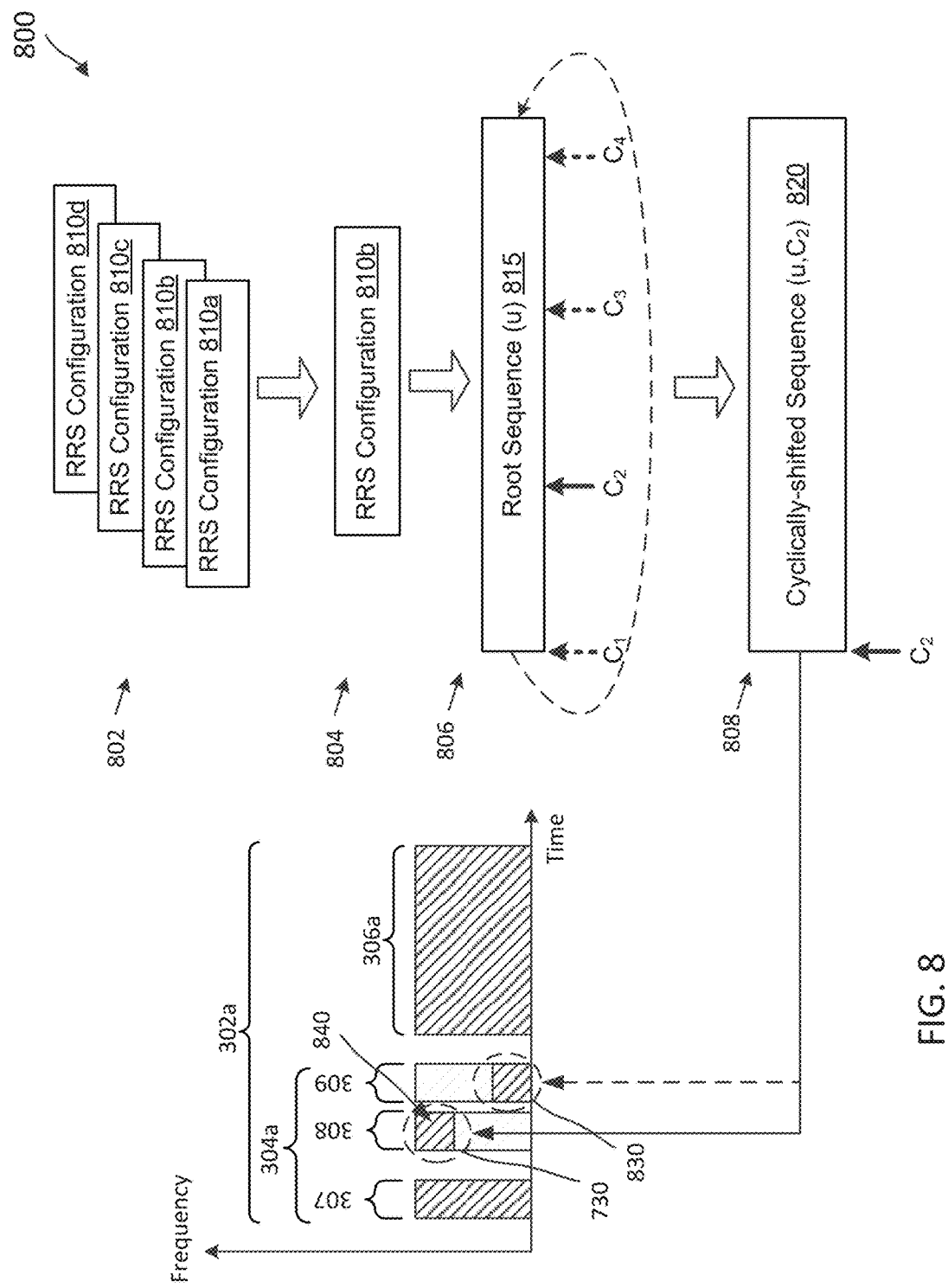
FIG. 8 illustrates a node-specific RRS signal generation and transmission scheme according to embodiments of the present disclosure.
Figure 9:
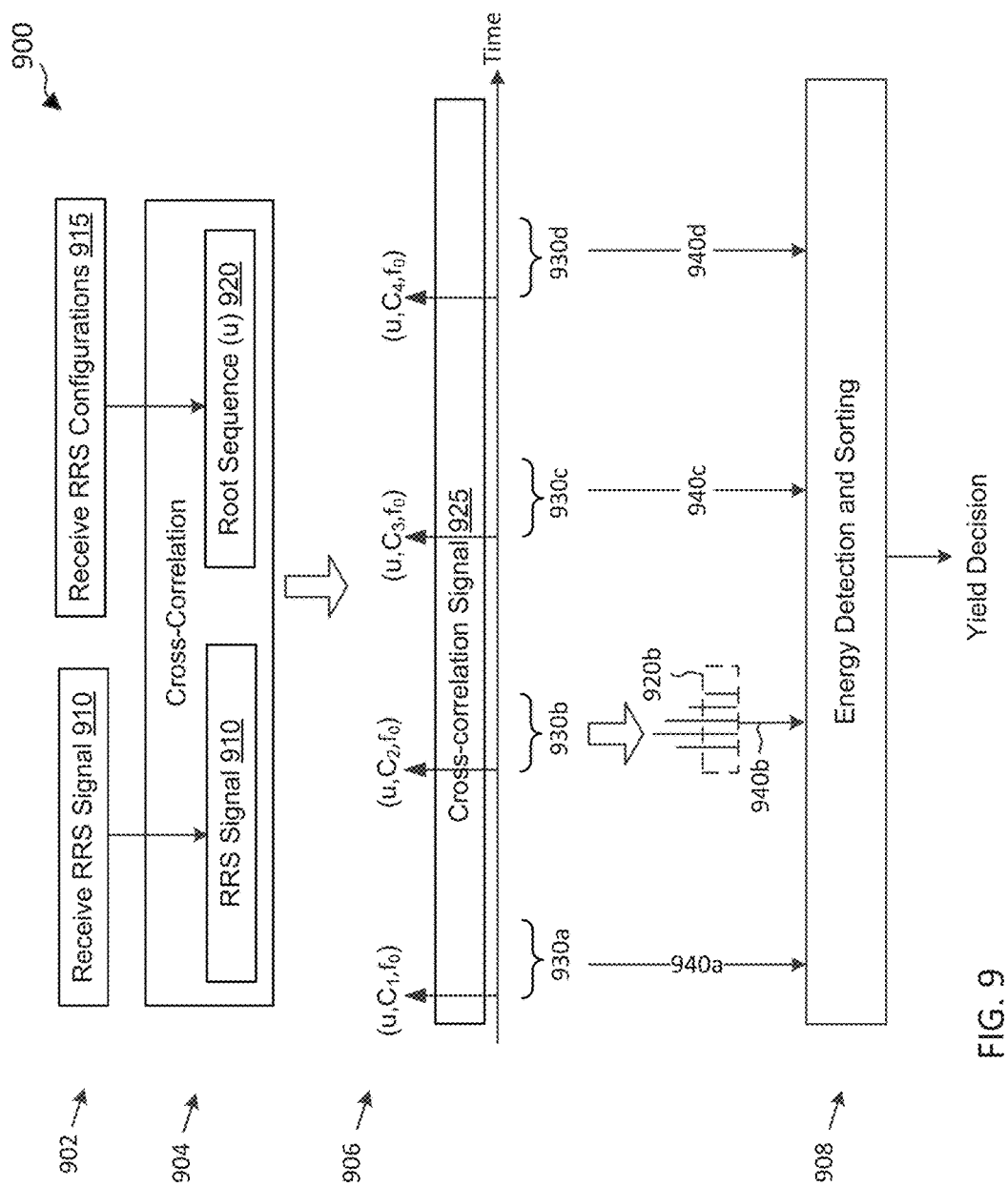
FIG. 9 illustrates a node-specific RRS signal detection scheme according to embodiments of the present disclosure.

FIGS. 7-9 illustrate various low complexity, efficient node-specific RRS signal transmission and detection mechanisms based on waveform patterns. FIG. 7 illustrates a node-specific RRS signal transmission scheme 700 according to embodiments of the present disclosure. The scheme 700 may be employed by the BSs 105, 205, and 600 and the UEs 115, 215, and 500. The scheme 700 may be used in conjunction with the scheme 300 to communicate node-specific reservation information via RRS signals (e.g., the RRS signals 322 and 324). In the scheme 700, all nodes (e.g., BSs and UEs) sharing a spectrum (e.g., the spectrum 301) in a network (e.g., the networks 100 and 200) are assigned with node-specific RRS configurations, for example, by a central authority such as an SAS. In addition, each node may be assigned with multiple node-specific RRS configurations for representing different reservation information. In some embodiments, the RRS configurations can also include information associated with cyclic-prefix (CP) length and/or subcarrier spacing for RRS signals. For example, RRS signals can have a different CP length and/or different subcarrier spacing compared to regular data transmissions.

An RRS configuration is defined by a combination of transmission waveform and transmission resource. In an embodiment, a waveform can be defined by a root sequence and a cyclic-shift value. For example, the root sequence can be a Zadoff-Chu sequence or any suitable root sequence where cyclically-shifted versions of the root sequence are orthogonal to each other. The orthogonality characteristic between the cyclically-shifted waveforms allows multiple nodes to transmit RRS signals with different cyclically-shifted waveforms on the same resource and allows monitoring nodes to detect and differentiate the different RRS signals from the same resource. As such, the scheme 700 can improve spectrum utilization efficiency and reduce implementation complexity.

As an example, 64 cyclic-shift values can be applied to a root sequence to produce 64 different orthogonal sequences or waveforms 710 shown as $710_{w1}$ to $710_{w64}$. The waveforms 710 can be divided into 4 groups 702, 704, 706, and 708, each including 16 waveforms 710. Within each group 702, 704, 706, or 708, each waveform 710 is assigned to a particular node shown as node N1 to node N16 for representing corresponding reservation information 722, 724, 726, or 728, respectively. For example, the node N1 may transmit the waveform $710_{w1}$ to represent the reservation information 722, and the node N16 may transmit the waveform $710_{w16}$ to represent the reservation information 722.

In some embodiments, each of the reservation information 722, 724, 726, or 728 may correspond to a particular range of RRS signal transmit power levels. In some embodiments, each of the reservation information 722, 724, 726, or 728 may correspond to a particular range of interference levels tolerated by an RRS transmitting node. In some embodiments, each of the reservation information 722, 724, 726, or 728 may correspond to a particular quantized reserved duration (e.g., 1 millisecond (ms), 2 ms, 3 ms, or 4 ms) within a TXOP (e.g., the TXOP 302), as described in greater detail herein.

In an embodiment, the scheme 700 may allocate the same resource 730 for the nodes N1 to N16 to transmit RRS signals including the waveforms 710. For example, the node N1 may transmit an RRS signal with the waveform $710_{w1}$ on the resource 730 to represent the reservation information 722, while the node N16 may transmit an RRS signal with the waveform $710_{w48}$ on the resource 730 at the same time to represent the reservation information 726. Since the waveforms 710 are orthogonal to each other, a monitoring node (e.g., the BSs 105 and 205 and the UEs 115 and 215) can detect each waveform 710 individually and extract corresponding reservation information 722, 724, 726, and/or 728.

In some embodiments, the scheme 700 may assign the same set of waveforms 710 to a different group of nodes with similar partitions and assign a different resource 732 to the different group of nodes for RRS signal transmissions. In order to use the scheme 700, the RRS configurations are known by all nodes in a network (e.g., the networks 100 and 200) sharing a spectrum (e.g., the spectrum 301). While FIG. 7 is illustrated with 64 waveforms 710 and 64 cyclically-shifted of a root sequence, the assignments of the waveforms 710, the allocation of the resources 730 and 732, and/or the selection of the root sequences and/or the cyclic shifts may be alternatively configured in any suitable combination to provide similar functionalities.

FIG. 8 illustrates a node-specific RRS signal transmission scheme 800 according to embodiments of the present disclosure. The scheme 800 may be employed by the BSs 105, 205, and 600 and the UEs 115, 215, and 500. The scheme 800 may be used in conjunction with the scheme 300 to communicate node-specific reservation information (e.g., the reservation information 722, 724, 726, and 728) via RRS signals (e.g., the RRS signals 322 and 324) with orthogonal waveforms (e.g., the waveform 710). The scheme 800 is similar to the scheme 700 and provides a more detailed view of the generation and transmission of RRS signals based on the assignments of the waveforms 710 to the node N1.

At step 802, the node N1 receives RRS configurations 810a, 810b, 810c, and 810d. The RRS configuration 810a indicates a root index, denoted as u, and a cyclic-shift value, denoted as $C_1$, for generating the waveform $710_{w1}$ to represent the reservation information 722 and the allocated transmission resource 730. The RRS configuration 810b indicates the root index u and a cyclic-shift value $C_2$ for generating the waveform $710_{w17}$ to represent the reservation information 724 and the allocated transmission resource 730. The third RRS configuration 810c indicates the root index u and a cyclic-shift value $C_3$ for generating the waveform $710_{w33}$ to represent the reservation information 726 and the allocated transmission resource 730. The RRS configuration 810d indicates the root index u and a cyclic-shift value $C_4$ for generating the waveform $710_{w49}$ to represent the reservation information 728 and the allocated transmission resource 730. While the RRS configurations are shown as separate configurations, the RRS configurations can be alternatively configured in any suitable configuration.

At step 804, the node N1 selects the RRS configuration 810b to represent the reservation information 724.

At step 806, the node N1 obtains a root sequence 815 corresponding to the root index u and cyclically shifts the root sequence 815 by the cyclic-shift value $C_2$ to produce a cyclically-shifted sequence 820 corresponding to the waveform $710_{w17}$.

At step 808, the node N1 transmits the cyclically-shifted sequence 820 using the allocated transmission resource 730. For example, the resource 730 is within the portion 308 of the CCA period 304a for operator-level reservation indication. Thus, the node N1 may transmit a node-specific RRS signal 840 including the cyclically-shifted sequence 820 (e.g., the waveform $710_{w17}$). In some embodiments, the node N1 may be configured with the same set of RRS configurations 810 for link-level reservation indication, but on a different resource 830 within the portion 309 of the CCA period 304a. In some other embodiments, the node N1 may be configured with a different set of RRS configurations for link-level reservation indication.

FIG. 9 illustrates a node-specific RRS signal detection scheme 900 according to embodiments of the present disclosure. The scheme 900 may be employed by the BSs 105, 205, and 600 and the UEs 115, 215, and 500. The scheme 900 may be used in conjunction with the schemes 300, 700, and 800. The scheme 900 can be employed by a monitoring node, which may be a UE or a BS, to detect and differentiate node-specific RRS signals from one or more RRS transmitting nodes, which may include UEs and BSs, by monitoring a single set of resource. For example, the monitoring node is configured with RRS configurations 915 (e.g., the RRS configurations 810) indicating a root sequence index u, a set of cyclic shift values, $C_1$, $C_2$, $C_3$, and $C_4$ and an allocated resource $f_0$ (e.g., the resource 730). For example, the cyclic shift values $C_1$ and $C_2$ are assigned to one node (e.g., the node N1) and the cyclic shift values $C_3$ and $C_4$ are assigned to another node (e.g., the node N16).

At step 902, the monitoring node monitors the resource $f_0$ and received an RRS signal 910. The RRS signal 910 may include one or more node-specific RRS signals (e.g., the node-specific RRS signal 840) generated and transmitted by one or more RRS transmitting nodes according to the scheme 800.

At step 904, the monitoring node computes a cross-correlation signal 925 between the received RRS signal 910 and a root sequence 920 (e.g., the root sequence 815) according to the RRS configurations 915.

At step 906, the monitoring node performs hypothesis tests based on the RRS configurations 915. The monitoring node positions a plurality of uncertainty or search windows 930 within the cross-correlation signal 925 according to the cyclic-shift values indicated in the RRS configurations 915. For example, the search windows 930a, 930b, 930c, and 930d are positioned according to the shifts $C_1$, $C_2$, $C_3$, and $C_4$, respectively.

At step 908, the monitoring node computes signal energy 940 for each search window 930. The signal energy 940b within the search window 930b is expanded for illustration purpose. As an example, the received RRS signal 910 may include a node-specific RRS signal with the cyclic shift $C_2$ from the node N1 and another node-specific RRS signal with the cyclic shift $C_3$ from the node N16. Thus, the signal energy 940b and 940c may have greater values than the signal energies 940a and 940d. When the node N1 is located near the monitoring node and the node N16 is located far away from the monitoring node, the signal energy 940b may have a greater value than the signal energy 940c. In an embodiment, the monitoring node may sort the signal energies 940 and determine a peak energy (e.g., the signal energy 940b) from among the signal energies 940. The monitoring node may determine a yield decision (e.g., whether to yield or to transmit during a following transmission period 306) based on the peak energy. For example, when the peak is above a threshold, the monitoring node may yield. Conversely, when the peak is below a threshold, the monitoring node may not yield. Alternatively, the monitoring node may proceed with transmission and determine transmission powers based on the peak energy. While the scheme 900 is illustrated with one root sequence, four cyclic shifts, and one resource, the scheme 900 can include any suitable number of root sequences, cyclic shifts, and/or resources using similar mechanisms.

Figure 10:
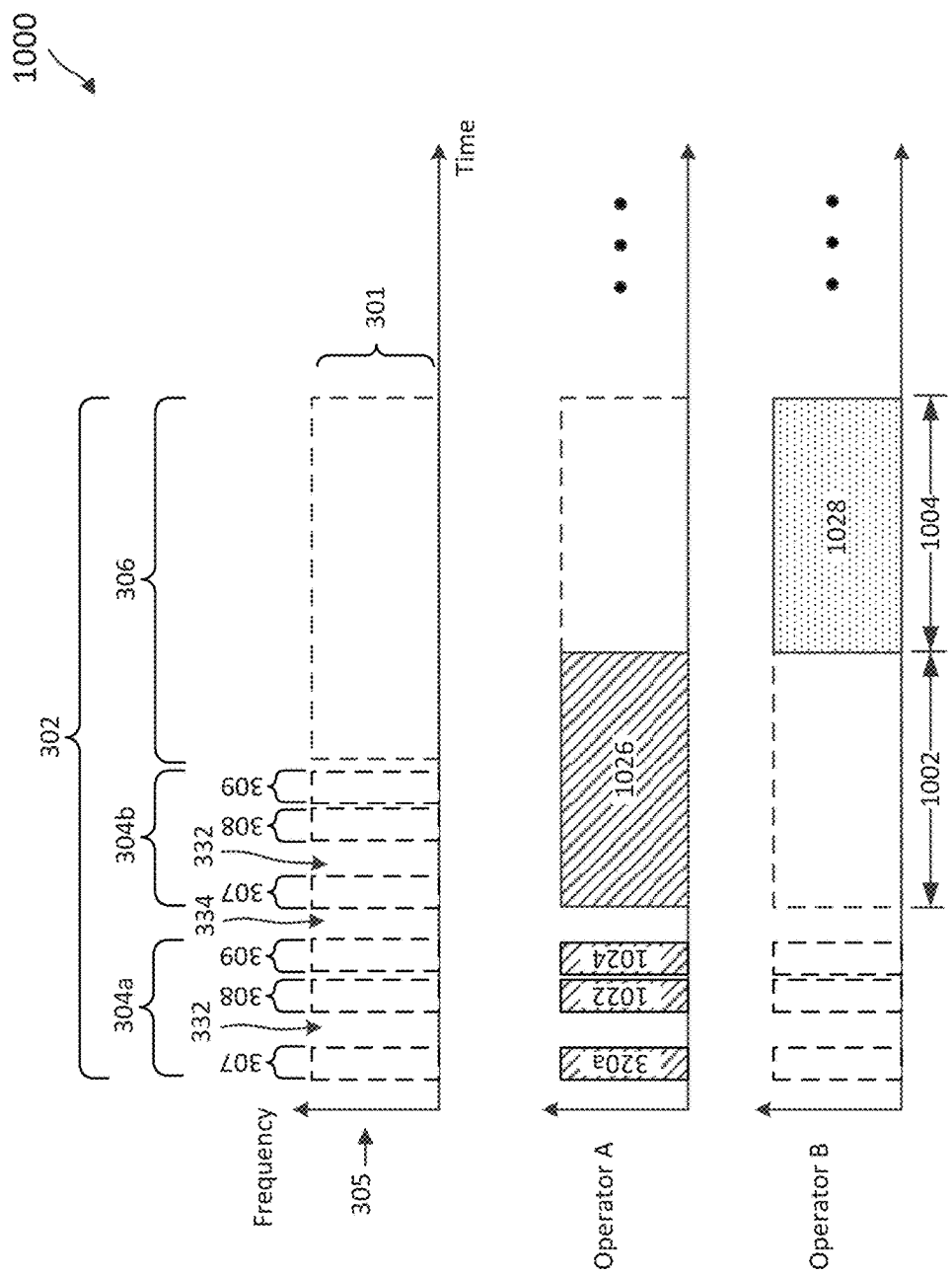
FIG. 10 illustrates a spectrum sharing scheme with reservation duration indications according to embodiments of the present disclosure.

FIG. 10 illustrates a spectrum sharing scheme 1000 with reservation duration indications according to embodiments of the present disclosure. The scheme 1000 may be employed by the BSs 105, 205, and 600 and the UEs 115, 215, and 500. The scheme 1000 may be employed in conjunction with the schemes 300, 700, 800, and 900 to communicate node-specific reservation duration information via RRS signals (e.g., the RRS signals 322, 324, 840, and 910) with node-specific reservation information.

As an example, Operator A has priority over Operator B in a particular TXOP 302. A BS A (e.g., the BS 205a1) of Operator A may transmit an RRQ signal 320a in the portion 307 of the CCA period 304a. The RRQ signal 320a may indicate a DL schedule for a UE A (e.g., the UE 215a1) of Operator A in a period 1002 (e.g., about 1 ms) within the transmission period 306. The UE A may transmit a node-specific RRS signal 1022 in the portion 308 of the CCA period 304a to silence low priority operator nodes (e.g., Operator B nodes). The node-specific RRS signal 1022 may be similar to the RRS signal 840. The UE A may generate the RRS signal 1022 according to the scheme 800. The RRS signal 1022 may include a waveform (e.g., the waveforms 710) that represents the period 1002. For example, the UE A is assigned with 4 different waveforms, each representing a particular duration (e.g., 1 ms, 2 ms, 3 ms, or 4 ms). Similarly, the UE A may transmit a node-specific RRS signal 1024 in the portion 309 of the CCA period 304a for link-level reservation indication. The node-specific RRS signal 1024 may be similar to the node-specific RRS signal 1022 and may include a waveform representing the period 1002. Subsequently, the BS A may communicate a signal 1026 with the UE A during the period 1002.

During the CCA period 304a, a BS B (e.g., the BS 205b1) of Operator B may monitor the channel and detect the node-specific RRS signal 1022. The Operator B may determine that the reservation for the transmission period 306 has a reserved period 1002 based on the waveform of the node-specific RRS signal 1022, for example, by employing the scheme 900. Thus, the BS B may communicate a signal 1028 with a UE B (e.g., the UE 215b1) in a subsequent period 1004 within the transmission period 306. When there are multiple low priority operators, the reservation for the remaining period within the transmission period 306 can be performed synchronously, for example, based on priorities, or asynchronously. The next TXOP 302 may be reserved using the same mechanisms as described in the scheme 300 and may additionally include similar reservation duration indications as described.

Figure 11:
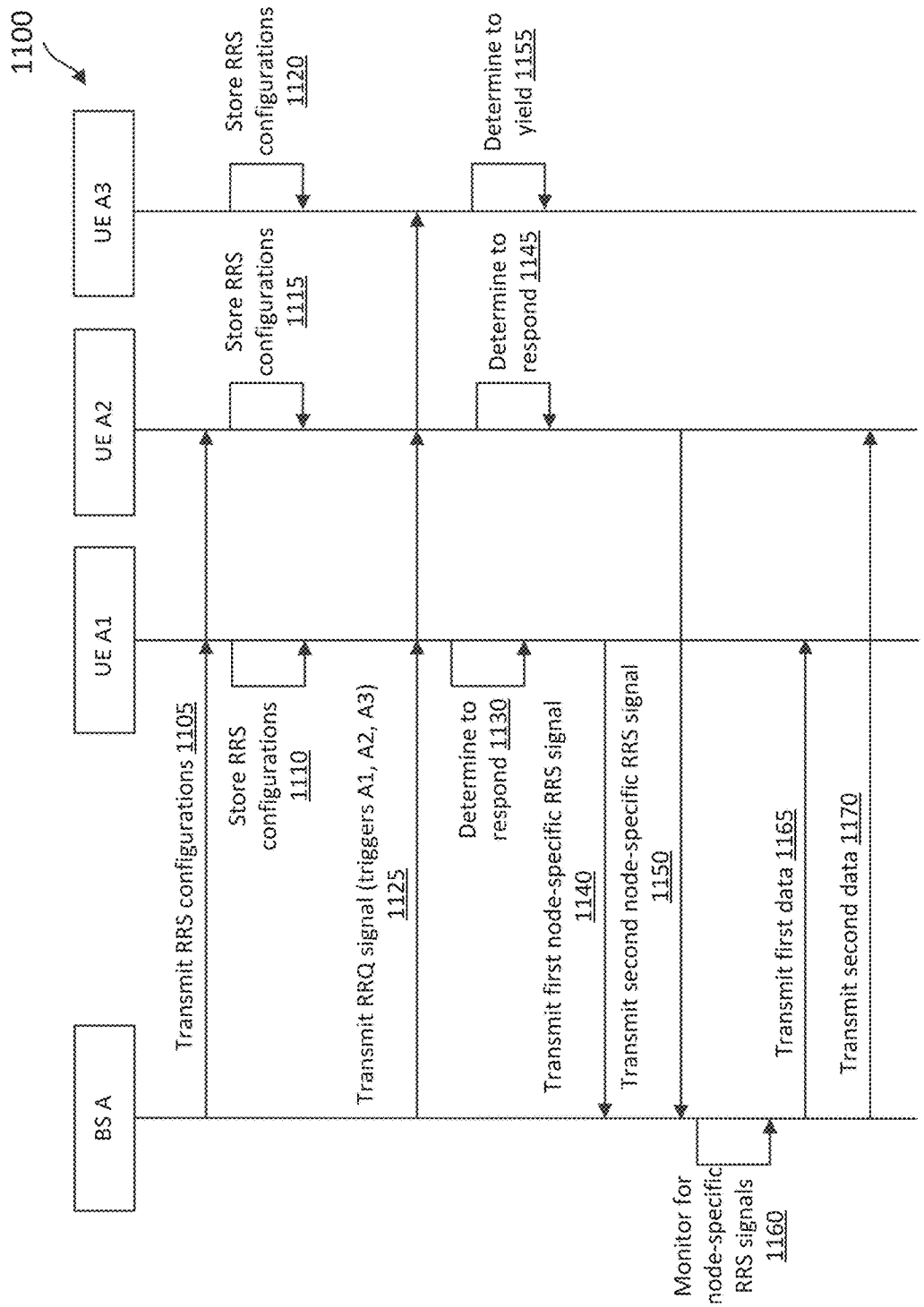
FIG. 11 is a signaling diagram of a spectrum sharing method using node-specific RRS signals within a serving cell according to embodiments of the present disclosure.

FIG. 11 is a signaling diagram of a spectrum sharing method 1100 using node-specific RRS signals within a serving cell according to embodiments of the present disclosure. The method 1100 is implemented among a BS A and UEs A1, A2, and A3. The BS A is similar to the BSs 105, 205, and 600. The UEs A1, A2, and A3 are similar to the UEs 115, 215, and 500. Steps of the method 1100 can be executed by computing devices (e.g., a processor, processing circuit, and/or other suitable component) of the BS A and the UEs A1, A2, and A3. The method 1100 may employ similar mechanisms as in the schemes 300, 700, 800, and 900 described with respect to FIGS. 3, 7, 8, and 9, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order. As an example, the BS A serves the UEs A1, A2, and A3, where the BS A and the UEs A1, A2, and A3 are Operator A nodes.

At step 1105, the BS A transmits RRS configurations (e.g., the RRS configurations 810 and 915) to the UE A1, the UE A2, and the UE A3. The RRS configurations may include a set of RRS configurations for each node (e.g., all operator nodes) sharing a spectrum (e.g., the spectrum 301). For example, the RRS configurations indicate at least root sequences (e.g., the root sequences 815 and 920) or root indices and cyclic-shift values for generating node-specific waveforms (e.g., the waveforms 710) and transmission resource (e.g., the resource 730) allocated to the UEs A1, A2, and A3. The RRS configurations may indicate that the UEs A1, A2, and A3 are assigned with the same transmission resource.

At step 1110, upon receiving the node-specific RRS configurations, the UE A1 stores the node-specific RRS configurations. At step 1115, the UE A2 stores the node-specific RRS configurations. At step 1120, the UE A3 stores the node-specific RRS configurations.

At step 1125, the BS A transmits an RRQ signal (e.g., the RRQ signals 320) to the UE A1, the UE A2, and the UE A3. The RRQ signal may include a DL trigger A1 for the UE A1, a DL trigger A2 for the UE A2, and a DL trigger A3 for the UE A3 in a following transmission period (e.g., the transmission period 306).

At step 1130, upon receiving the RRQ signal, the UE A1 determines to respond to the DL trigger A1, for example, based on prior channel listening. Thus, at step 1140, the UE A1 transmits a first node-specific RRS signal (e.g., the RRS signal 840) according to the stored RRS configurations, for example, by employing the scheme 800. For example, the first node-specific RRS signal includes a first particular waveform with a root index and a first cyclic-shift value.

At step 1145, upon receiving the RRQ signal, the UE A2 determines to respond to the DL trigger A2, for example, based on prior channel listening. Thus, at step 1150, the UE A2 transmits a second node-specific RRS signal according to the stored RRS configurations. For example, the second node-specific RRS signal includes a second particular waveform with the root index and a second cyclic-shift value.

At step 1155, upon receiving the RRQ signal, the UE A3 determines not to respond the DL trigger A2, for example, based on prior channel listening. Thus, the UE A3 does not transmit a node-specific RRS signal.

At step 1160, the BS A monitors the allocated resource for RRS signals from the scheduled UE A1, the UE A2, and the UE A3, for example, by employing the scheme 900. For example, the BS A receives a signal (e.g., the RRS signal 910) from the allocated resource.

The BS A may determine that the signal energy (e.g., the signal energy 940) in a search window (e.g., the search window 930) corresponding to a cyclic-shift value assigned to the UE A1 is greater than a threshold. Thus, at step 1165, the BS A transmits first data to the UE A1.

The BS A may determine that the signal energy in a search window corresponding to a cyclic-shift value assigned to the UE A2 is greater than a threshold. Thus, at step 1170, the BS A transmits second data to the UE A2.

The BS A may determine that the signal energy in a search window corresponding to a cyclic-shift value assigned to the UE A3 is below a threshold. Thus, the BS A may refrain from transmitting data to the UE A3 as scheduled by the DL trigger A3.

As can be seen, node-specific RRS signals can function as CTS signals, allowing a scheduling BS to determine whether the channel is clear for transmission to a particular UE. While the method 1100 is illustrated in the context of DL scheduling, the method 1100 can be applied to UL scheduling to achieve similar functionalities. In addition, the CTS signal allows the BS to update its scheduling decision by scheduling DL or UL to UE that can transmit or receive instead of wasting system resource by scheduling UEs that cannot transmit or receive.

Figure 12:
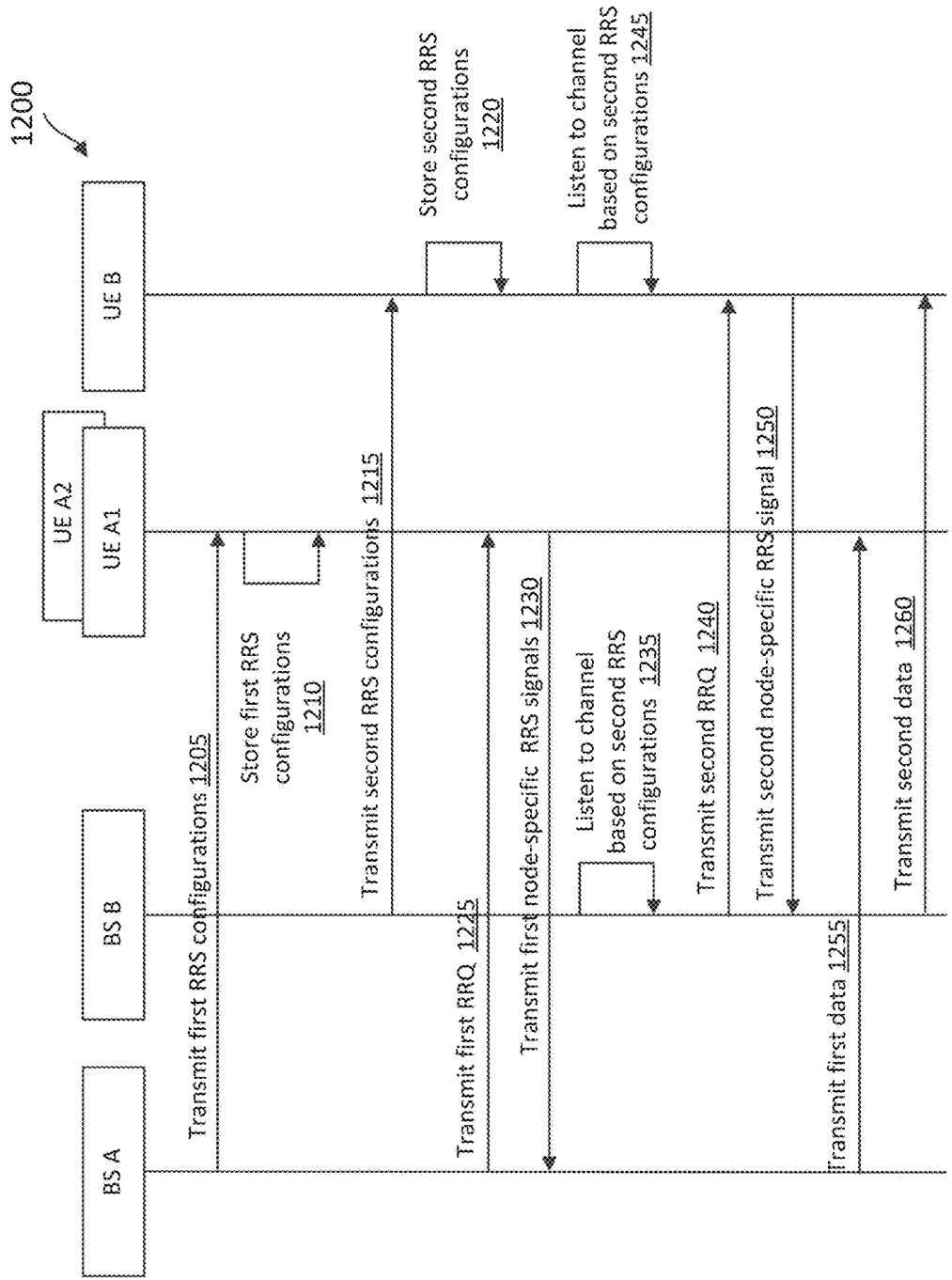
FIG. 12 is a signaling diagram of a spectrum sharing method using node-specific RRS signals across operators according to embodiments of the present disclosure.

FIG. 12 is a signaling diagram of a spectrum sharing method 1200 using node-specific RRS signals across operators according to embodiments of the present disclosure. The method 1200 is implemented among BSs A and B and UEs A1, A2, and B. The BSs A and B are similar to the BSs 105, 205, and 600. The UEs A1, A2, and B are similar to the UEs 115, 215, and 500. Steps of the method 1200 can be executed by computing devices (e.g., a processor, processing circuit, and/or other suitable component) of the BSs A and B and the UEs A1, A2, and B. The method 1200 may employ similar mechanisms as in the schemes 300, 700, 800, 900, 1000 described with respect to FIGS. 3, 7, 8, 9, and 10, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order. As an example, the BS A and the UEs A1 and A2 are operated by Operator A, while the BS B and the UE B are operated by Operator B, where Operator A has priority over Operator B in a particular TXOP (e.g., the TXOP 302) over a shared spectrum (e.g., the spectrum 301).

At step 1205, the BS A transmits first RRS configurations (e.g., the RRS configurations 810 and 915) to the UE A1 and the UE A2. At step 1210, the UE A1 and the UE A2 store the first RRS configurations.

At step 1215, the BS B transmits second RRS configurations to the UE B. The second RRS configurations may be substantially similar to the first node-specific RRS configurations. At step 1220, the UE B stores the second RRS configurations. In some embodiments, the first RRS configurations and the second configurations may be substantially similar. In some embodiments, the first RRS configuration and the second RRS configurations may include a mapping between each waveform (e.g., the waveforms 710), each reservation information (e.g., the reservation information 722, 724, 726, and 728), and each node for a serving cell and a less detailed mapping (e.g., mappings between waveforms and reservation information) for neighboring cells.

At step 1225, the BS A transmits a first RRQ signal (e.g., the RRQ signals 320) to schedule the UE A1 and the UE A2 during a CCA period (e.g., the CCA period 304). The RRQ signal may include a DL trigger for the UE A1 and a DL trigger for the UE A2 in a following transmission period (e.g., the transmission period 306).

At step 1230, upon receiving the RRQ signal, each of the UE A1 and the UE A2 transmits a first node-specific RRS signal of a different waveform (e.g., the waveforms 710) one the same resource (e.g., the resource 730) according to the first RRS configurations, for example, according to the scheme 800.

At step 1235, the BS B listens to the channel based on the second node-specific RRS configurations during the CCA period, for example, by employing the scheme 900. For example, the UE A1, the UE A2, and the BS A are located far away from the UE B. Thus, while the sum of the first node-specific RRS signals may have high signal strength, the BS B can determine that each of the first node-specific RRS signal has a weak signal strength. In addition, the BS B may obtain additional reservation information from the first and second node-specific RRS signals. For example, the BS B determines that a communication with the UE B may not create significant interference to the UEs A1 and A2 based on the listening. Thus, at step 1240, the BS B transmits a second RRQ signal to the schedule the UE B in the following transmission period.

At step 1245, the UE B listens to the channel based on the second RRS configurations, for example, by employing the scheme 900, and determines that the channel is clear for data reception. Thus, at step 1250, the UE B transmits a second RRS signal.

At step 1255, the BS A transmits first data to the UE A1 and the UE A2 in the following transmission period. At step 1260, the BS B transmits second data to the BS B during the same transmission period.

As can be seen, by enabling a monitoring node (e.g., the BS B) to detect and differentiate different node-specific RRS signals from different RRS transmitting nodes, the monitoring node can make better yielding decision and to reuse the shared spectrum that may otherwise be underutilized. While the method 1200 is illustrated in the context of DL scheduling, the method 1200 can be applied to UL scheduling to achieve similar functionalities.

Figure 13:
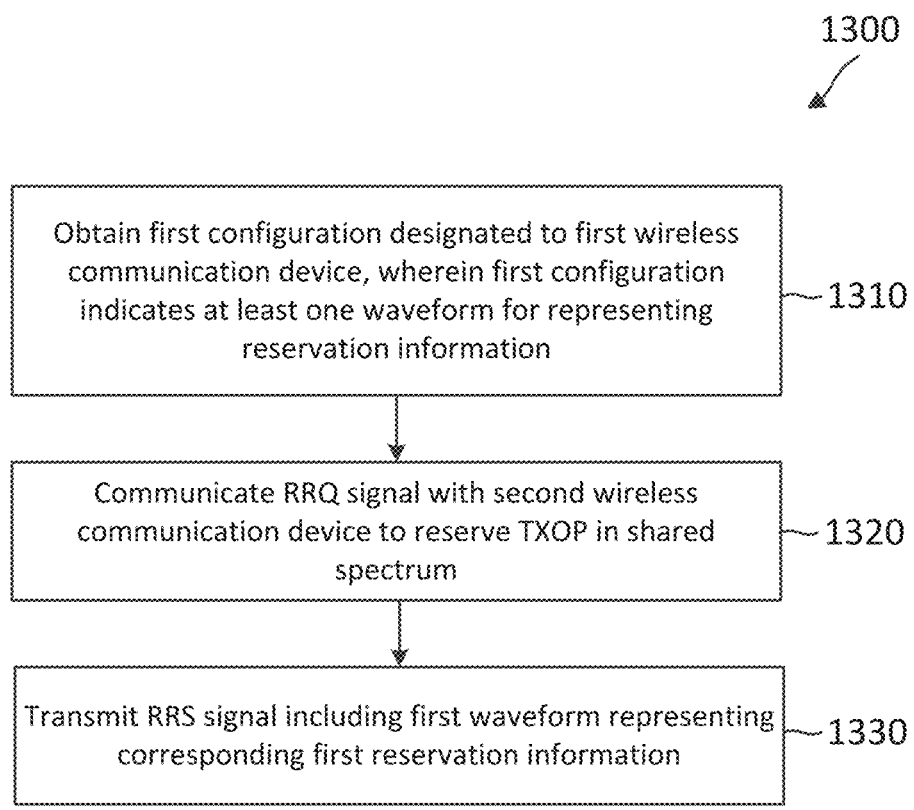
FIG. 13 is a flow diagram of a spectrum sharing method using node-specific RRS signals according to embodiments of the present disclosure.

FIG. 13 is a flow diagram of communicating node-specific reservation information according to embodiments of the present disclosure. Steps of the method 1300 can be executed by a computing device (e.g., a processor, processing circuit, and/or other suitable component) of a wireless communication device, such as the BSs 105, 205, and 600 and the UEs 115, 215, and 500. The method 1300 may employ similar mechanisms as in the schemes 300, 700, 800, 900, 1000, and the methods 1100 and 1200 described with respect to FIGS. 3, 7, 8, 9, 10, 11, and 12, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes obtaining a first configuration (e.g., the RRS configurations 810 and 915). The first configuration may indicate at least one waveform (e.g., the waveforms 710) for representing reservation information (e.g., the reservation information 722, 724, 726, and 728).

At step 1320, the method 1300 includes communicating an RRQ signal (e.g., the RRQ signal 320) with a second wireless communication device to reserve a TXOP (e.g., the TXOP 302) in a shared spectrum (e.g., the spectrum 301).

At step 1330, the method 1300 includes transmitting an RRS signal (e.g., the node-specific RRS signal 840) including a first waveform representing corresponding first reservation information.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of [at least one of A, B, or C] means A or B or C or AB or AC or BC or ABC (i.e., A and B and C).

Embodiments of the present disclosure include a method of wireless communication, comprising obtaining, by a first wireless communication device, a first configuration designated to the first wireless communication device, wherein the first configuration indicates at least one waveform for representing reservation information; and transmitting, by the first wireless communication device, a reservation signal to reserve a transmission opportunity (TXOP) in a shared spectrum, wherein the reservation signal includes a first waveform representing corresponding first reservation information based on the first configuration.

The method further includes wherein the first waveform is associated with a root sequence and a cyclic-shift value. The method further includes wherein the first reservation information indicates a transmit power level of the reservation signal. The method further includes wherein the first reservation information indicates an interference tolerance level of the first wireless communication device. The method further includes wherein the first configuration indicates a first resource allocated to the first wireless communication device, and wherein the transmitting the reservation signal includes transmitting the reservation signal using the first resource. The method further includes communicating, by the first wireless communication device with a second wireless communication device, a reservation request (RRQ) signal, wherein the reservation signal is a reservation response (RRS) signal transmitted in response to the RRQ signal, wherein the shared spectrum is shared by a first network operating entity and a second network operating entity, and wherein the first wireless communication device and the second wireless communication device are associated with the first network operating entity; and communicating, by the first wireless communication device with the second wireless communication device over the shared spectrum, data during the TXOP. The method further includes wherein the first reservation information indicates a reserved duration within the TXOP, and wherein the communicating the data includes communicating the data during the reserved duration within the TXOP. The method further includes obtaining, by the first wireless communication device, a second configuration designated to a third wireless communication device associated with the first network operating entity; transmitting, by the first wireless communication device, another RRQ signal in another TXOP for communication with the third wireless communication device; and monitoring, by the first wireless communication device, for an RRS signal from the third wireless communication device according to the second configuration. The method further includes refraining, by the first wireless communication device, from communicating with the third wireless communication device over the shared spectrum during the another TXOP when there is no RRS signal detected from the third wireless communication device. The method further includes determining, by the first wireless communication device, a received RRS energy of the RRS signal when the RRS signal from the third wireless communication device is detected by the monitoring; determining, by the first wireless communication device, whether the received RRS energy is greater than a threshold; and refraining, by the first wireless communication device, from communicating with the third wireless communication device over the shared spectrum during the another TXOP when received RRS energy is determined to be less than the threshold. The method further includes wherein the first wireless communication device is associated with a first priority, and wherein the method further comprises obtaining, by the first wireless communication device, a second configuration designated to a second wireless communication device associated with a second priority higher than the first priority; obtaining, by the first wireless communication device, a third configuration designated to a third wireless communication device associated with the second priority; monitoring, by the first wireless communication device, for an RRS signal from the second wireless communication device reserving another TXOP in the shared spectrum according to the second configuration; and monitoring, by the first wireless communication device, for an RRS signal from the third wireless communication device reserving the another TXOP in the shared spectrum according to the third configuration. The method further includes wherein the second configuration indicates a second waveform and a second resource, and wherein the third configuration indicates a third waveform and a third resource. The method further includes wherein the second waveform and the third waveform are different waveforms, and wherein the second resource and the third resource correspond to a same resource. The method further includes wherein the second waveform and the third waveform correspond to a same waveform, and wherein the second resource and the third resource are different resources. The method further includes wherein the second waveform represents second reservation information, wherein the third waveform represents third reservation information, and wherein the method further comprises determining, by the first wireless communication device, that a first RRS energy of the RRS signal from the second wireless communication device reserving another TXOP is greater than a second RRS energy of the RRS signal from the third wireless communication device reserving the another TXOP; and yielding, by the first wireless communication device, access to the shared spectrum during the another TXOP based on at least one of the first RRS energy or the second reservation information. The method further includes wherein the second waveform represents second reservation information, wherein the third waveform represents third reservation information, and wherein the method further comprises determining, by the first wireless communication device, that a first RRS energy of the RRS signal from the second wireless communication device reserving another TXOP is greater than a second RRS energy of the RRS signal from the third wireless communication device reserving the another TXOP; and transmitting, by the first wireless communication device in the shared spectrum, data during the another TXOP based on at least one of the first RRS energy or the second reservation information. The method further includes wherein the second reservation information indicates a reserved duration in the another TXOP, and wherein the transmitting the data during the another TXOP includes transmitting the data during another duration within the another TXOP.

Embodiments of the present disclosure further include an apparatus comprising a processor configured to obtain a first configuration designated to the apparatus, wherein the first configuration indicates at least one waveform for representing reservation information; and a transceiver configured to transmit a reservation signal to reserve a transmission opportunity (TXOP) in a shared spectrum, wherein the reservation signal includes a first waveform representing corresponding first reservation information based on the first configuration.

The apparatus further includes wherein the first waveform is associated with a root sequence and a cyclic-shift value. The apparatus further includes wherein the first reservation information indicates a transmit power level of the reservation signal. The apparatus further includes wherein the first reservation information indicates an interference tolerance level of the apparatus. The apparatus further includes wherein the first configuration indicates a first resource allocated to the apparatus, and wherein the transceiver is further configured to transmit the reservation signal by transmitting the reservation signal using the first resource. The apparatus further includes wherein the transceiver is further configured to communicate, with a second wireless communication device, a reservation request (RRQ) signal, wherein the reservation signal is a reservation response (RRS) signal transmitted in response to the RRQ signal, wherein the shared spectrum is shared by a first network operating entity and a second network operating entity, and wherein the apparatus and the second wireless communication device are associated with the first network operating entity; and communicate, with the second wireless communication device over the shared spectrum, data during the TXOP. The apparatus further includes wherein the first reservation information indicates a reserved duration within the TXOP, and wherein the transceiver is further configured to communicate the data by communicating the data during the reserved duration within the TXOP. The apparatus further includes wherein the transceiver is further configured to transmit another RRQ signal in another TXOP for communication with a third wireless communication device, and wherein the processor is further configured to obtain a second configuration designated to the third wireless communication device associated with the first network operating entity; and monitor for an RRS signal from the third wireless communication device according to the second configuration. The apparatus further includes wherein the processor is further configured to refrain from communicating with the third wireless communication device over the shared spectrum during the another TXOP when there is no RRS signal detected from the third wireless communication device. The apparatus further includes wherein the processor is further configured to determine a received RRS energy of the RRS signal when the RRS signal from the third wireless communication device is detected by the monitoring; determine whether the received RRS energy is greater than a threshold; and refrain from communicating with the third wireless communication device over the shared spectrum during the another TXOP when received RRS energy is determined to be less than the threshold. The apparatus further includes wherein the apparatus is associated with a first priority, and wherein the processor is further configured to obtain a second configuration designated to a second wireless communication device associated with a second priority higher than the first priority; obtain a third configuration designated to a third wireless communication device associated with the second priority; monitor for an RRS signal from the second wireless communication device reserving another TXOP in the shared spectrum according to the second configuration; and monitor for an RRS signal from the third wireless communication device reserving the another TXOP in the shared spectrum according to the third configuration. The apparatus further includes wherein the second configuration indicates a second waveform and a second resource, and wherein the third configuration indicates a third waveform and a third resource. The apparatus further includes wherein the second waveform and the third waveform are different waveforms, and wherein the second resource and the third resource correspond to a same resource. The apparatus further includes wherein the second waveform and the third waveform correspond to a same waveform, and wherein the second resource and the third resource are different resources. The apparatus further includes wherein the second waveform represents second reservation information, wherein the third waveform represents third reservation information, and wherein the processor is further configured to determine that a first RRS energy of the RRS signal from the second wireless communication device reserving another TXOP is greater than a second RRS energy of the RRS signal from the third wireless communication device reserving the another TXOP; and yield access to the shared spectrum during the another TXOP based on at least one of the first RRS energy or the second reservation information. The apparatus further includes wherein the second waveform represents second reservation information, wherein the third waveform represents third reservation information, and wherein the processor is further configured to determine that a first RRS energy of the RRS signal from the second wireless communication device reserving another TXOP is greater than a second RRS energy of the RRS signal from the third wireless communication device reserving the another TXOP, and wherein the transceiver is further configured to transmit, in the shared spectrum, data during the another TXOP based on at least one of the first RRS energy or the second reservation information. The apparatus further includes wherein the second reservation information indicates a reserved duration in the another TXOP, and wherein the transceiver is further configured to transmit the data during the another TXOP by transmitting the data during another duration within the another TXOP.

Embodiments of the present disclosure further include a computer-readable medium having program code recorded thereon, the program code comprising code for causing a first wireless communication device to obtain a first configuration designated to the first wireless communication device, wherein the first configuration indicates at least one waveform for representing reservation information; and code for causing the first wireless communication device to transmit a reservation signal to reserve a transmission opportunity (TXOP) in a shared spectrum, wherein the reservation signal includes a first waveform representing corresponding first reservation information based on the first configuration.

The computer-readable medium further includes wherein the first waveform is associated with a root sequence and a cyclic-shift value. The computer-readable medium further includes wherein the first reservation information indicates a transmit power level of the reservation signal. The computer-readable medium further includes wherein the first reservation information indicates an interference tolerance level of the first wireless communication device. The computer-readable medium further includes wherein the first configuration indicates a first resource allocated to the first wireless communication device, and wherein the code for causing the first wireless communication device to transmit the reservation signal is further configured to transmit the reservation signal using the first resource. The computer-readable medium further includes code for causing the first wireless communication device to communicate, with a second wireless communication device, a reservation request (RRQ) signal, wherein the reservation signal is a reservation response (RRS) signal transmitted in response to the RRQ signal, wherein the shared spectrum is shared by a first network operating entity and a second network operating entity, and wherein the first wireless communication device and the second wireless communication device are associated with the first network operating entity; and code for causing the first wireless communication device to communicate, with the second wireless communication device over the shared spectrum, data during the TXOP. The computer-readable medium further includes wherein the first reservation information indicates a reserved duration within the TXOP, and wherein the code for causing the first wireless communication device to communicate the data is further configured to communicate the data during the reserved duration within the TXOP. The computer-readable medium further includes code for causing the first wireless communication device to obtain a second configuration designated to a third wireless communication device associated with the first network operating entity; code for causing the first wireless communication device to transmit another RRQ signal in another TXOP for communication with the third wireless communication device; and code for causing the first wireless communication device to monitor for an RRS signal from the third wireless communication device according to the second configuration. The computer-readable medium further includes code for causing the first wireless communication device to refrain from communicating with the third wireless communication device over the shared spectrum during the another TXOP when there is no RRS signal detected from the third wireless communication device. The computer-readable medium further includes code for causing the first wireless communication device to determine a received RRS energy of the RRS signal when the RRS signal from the third wireless communication device is detected by the monitoring; code for causing the first wireless communication device to determine whether the received RRS energy is greater than a threshold; and code for causing the first wireless communication device to refrain from communicating with the third wireless communication device over the shared spectrum during the another TXOP when received RRS energy is determined to be less than the threshold. The computer-readable medium further includes wherein the first wireless communication device is associated with a first priority, and wherein the computer-readable medium further comprises code for causing the first wireless communication device to obtain a second configuration designated to a second wireless communication device associated with a second priority higher than the first priority; code for causing the first wireless communication device to obtain a third configuration designated to a third wireless communication device associated with the second priority; code for causing the first wireless communication device to monitor for an RRS signal from the second wireless communication device reserving another TXOP in the shared spectrum according to the second configuration; and code for causing the first wireless communication device to monitor for an RRS signal from the third wireless communication device reserving the another TXOP in the shared spectrum according to the third configuration. The computer-readable medium further includes wherein the second configuration indicates a second waveform and a second resource, and wherein the third configuration indicates a third waveform and a third resource. The computer-readable medium further includes wherein the second waveform and the third waveform are different waveforms, and wherein the second resource and the third resource correspond to a same resource. The computer-readable medium further includes wherein the second waveform and the third waveform correspond to a same waveform, and wherein the second resource and the third resource are different resources. The computer-readable medium further includes wherein the second waveform represents second reservation information, wherein the third waveform represents third reservation information, and wherein the computer-readable medium further comprises code for causing the first wireless communication device to determine that a first RRS energy of the RRS signal from the second wireless communication device reserving another TXOP is greater than a second RRS energy of the RRS signal from the third wireless communication device reserving the another TXOP; and code for causing the first wireless communication device to access to the shared spectrum during the another TXOP based on at least one of the first RRS energy or the second reservation information. The computer-readable medium further includes wherein the second waveform represents second reservation information, wherein the third waveform represents third reservation information, and wherein the computer-readable medium further comprises code for causing the first wireless communication device to that a first RRS energy of the RRS signal from the second wireless communication device reserving another TXOP is greater than a second RRS energy of the RRS signal from the third wireless communication device reserving the another TXOP; and code for causing the first wireless communication device to transmit, in the shared spectrum, data during the another TXOP based on at least one of the first RRS energy or the second reservation information. The computer-readable medium further includes wherein the second reservation information indicates a reserved duration in the another TXOP, and wherein the code for causing the first wireless communication device to transmit the data during the another TXOP is further configured to transmit the data during another duration within the another TXOP.

Embodiments of the present disclosure further include an apparatus comprising means for obtaining a first configuration designated to the apparatus, wherein the first configuration indicates at least one waveform for representing reservation information; and means for transmitting a reservation signal to reserve a transmission opportunity (TXOP) in a shared spectrum, wherein the reservation signal includes a first waveform representing corresponding first reservation information based on the first configuration.

The apparatus further includes wherein the first waveform is associated with a root sequence and a cyclic-shift value. The apparatus further includes wherein the first reservation information indicates a transmit power level of the reservation signal. The apparatus further includes wherein the first reservation information indicates an interference tolerance level of the apparatus. The apparatus further includes wherein the first configuration indicates a first resource allocated to the apparatus, and wherein means for transmitting the reservation signal is further configured to transmit the reservation signal using the first resource. The apparatus further includes means for communicating, with a second wireless communication device, a reservation request (RRQ) signal, wherein the reservation signal is a reservation response (RRS) signal transmitted in response to the RRQ signal, wherein the shared spectrum is shared by a first network operating entity and a second network operating entity, and wherein the apparatus and the second wireless communication device are associated with the first network operating entity; and means for communicating, with the second wireless communication device over the shared spectrum, data during the TXOP. The apparatus further includes wherein the first reservation information indicates a reserved duration within the TXOP, and wherein the means for communicating the data by communicating the data during the reserved duration within the TXOP. The apparatus further includes means for obtaining a second configuration designated to a third wireless communication device associated with the first network operating entity; means for transmitting another RRQ signal in another TXOP for communication with the third wireless communication device; and means for monitor for an RRS signal from the third wireless communication device according to the second configuration. The apparatus further includes means for refraining from communicating with the third wireless communication device over the shared spectrum during the another TXOP when there is no RRS signal detected from the third wireless communication device. The apparatus further includes means for determining a received RRS energy of the RRS signal when the RRS signal from the third wireless communication device is detected by the monitoring; means for determining whether the received RRS energy is greater than a threshold; and means for refraining from communicating with the third wireless communication device over the shared spectrum during the another TXOP when received RRS energy is determined to be less than the threshold. The apparatus further includes wherein the apparatus is associated with a first priority, and wherein the apparatus further comprises means for obtaining a second configuration designated to a second wireless communication device associated with a second priority higher than the first priority; means for obtaining a third configuration designated to a third wireless communication device associated with the second priority; means for monitoring for an RRS signal from the second wireless communication device reserving another TXOP in the shared spectrum according to the second configuration; and means for monitoring for an RRS signal from the third wireless communication device reserving the another TXOP in the shared spectrum according to the third configuration. The apparatus further includes wherein the second configuration indicates a second waveform and a second resource, and wherein the third configuration indicates a third waveform and a third resource. The apparatus further includes wherein the second waveform and the third waveform are different waveforms, and wherein the second resource and the third resource correspond to a same resource. The apparatus further includes wherein the second waveform and the third waveform correspond to a same waveform, and wherein the second resource and the third resource are different resources. The apparatus further includes wherein the second waveform represents second reservation information, wherein the third waveform represents third reservation information, and wherein the apparatus further comprises means for determining that a first RRS energy of the RRS signal from the second wireless communication device reserving another TXOP is greater than a second RRS energy of the RRS signal from the third wireless communication device reserving the another TXOP; and means for yielding access to the shared spectrum during the another TXOP based on at least one of the first RRS energy or the second reservation information. The apparatus further includes wherein the second waveform represents second reservation information, wherein the third waveform represents third reservation information, and wherein the apparatus further comprises means for determining that a first RRS energy of the RRS signal from the second wireless communication device reserving another TXOP is greater than a second RRS energy of the RRS signal from the third wireless communication device reserving the another TXOP; and means for transmitting, in the shared spectrum, data during the another TXOP based on at least one of the first RRS energy or the second reservation information. The apparatus further includes wherein the second reservation information indicates a reserved duration in the another TXOP, and wherein the means for transmitting the data during the another TXOP is further configured to transmit the data during another duration within the another TXOP.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    obtaining, by a first wireless communication device, a first configuration designated to the first wireless communication device, wherein the first configuration indicates at least one node-specific reservation signal configuration with at least one waveform for representing reservation information, the at least one node-specific reservation signal configuration specific to the first wireless communication device; and
    transmitting, by the first wireless communication device, a reservation signal to reserve a transmission opportunity (TXOP) in a shared spectrum, wherein the reservation signal includes a first waveform representing corresponding first reservation information based on the first configuration,
    wherein the first reservation information indicates at least one of a transmit power level of the reservation signal, an interference tolerance level of the first wireless communication device, or a first resource allocated to the first wireless communication device, and wherein the transmitting the reservation signal includes transmitting the reservation signal using the first resource when the first reservation information indicates the first resource.

2. The method of claim 1, wherein the first waveform is associated with a root sequence and a cyclic-shift value.

3. The method of claim 1, further comprising:
    communicating, by the first wireless communication device with a second wireless communication device, a reservation request (RRQ) signal, wherein the reservation signal is a reservation response (RRS) signal transmitted in response to the RRQ signal, wherein the shared spectrum is shared by a first network operating entity and a second network operating entity, and wherein the first wireless communication device and the second wireless communication device are associated with the first network operating entity; and
    communicating, by the first wireless communication device with the second wireless communication device over the shared spectrum, data during the TXOP.

4. The method of claim 3, wherein the first reservation information indicates a reserved duration within the TXOP, and wherein the communicating the data includes communicating the data during the reserved duration within the TXOP.

5. The method of claim 3, further comprising:
    obtaining, by the first wireless communication device, a second configuration designated to a third wireless communication device associated with the first network operating entity;
    transmitting, by the first wireless communication device, another RRQ signal in another TXOP for communication with the third wireless communication device; and
    monitoring, by the first wireless communication device, for an RRS signal from the third wireless communication device according to the second configuration.

6. The method of claim 5, further comprising refraining, by the first wireless communication device, from communicating with the third wireless communication device over the shared spectrum during the another TXOP when there is no RRS signal detected from the third wireless communication device based on an energy threshold comparison.

7. The method of claim 1, wherein the first wireless communication device is associated with a first priority, and wherein the method further comprises:
    obtaining, by the first wireless communication device, a second configuration designated to a second wireless communication device associated with a second priority higher than the first priority;
    obtaining, by the first wireless communication device, a third configuration designated to a third wireless communication device associated with the second priority;
    monitoring, by the first wireless communication device, for an RRS signal from the second wireless communication device reserving another TXOP in the shared spectrum according to the second configuration; and
    monitoring, by the first wireless communication device, for an RRS signal from the third wireless communication device reserving the another TXOP in the shared spectrum according to the third configuration.

8. The method of claim 7, wherein the second configuration indicates a second waveform and a second resource, wherein the third configuration indicates a third waveform and a third resource, and wherein at least one of:
    the second resource is different from the third resource; or
    the second waveform is different from the third waveform.

9. The method of claim 8, wherein the second waveform represents second reservation information, wherein the third waveform represents third reservation information, and wherein the method further comprises:
    determining, by the first wireless communication device, that a first RRS energy of the RRS signal from the second wireless communication device reserving another TXOP is greater than a second RRS energy of the RRS signal from the third wireless communication device reserving the another TXOP; and
    determining, by the first wireless communication device, whether to yield access to the shared spectrum during the another TXOP or transmit data in the shared spectrum during the another TXOP based on at least one of the first RRS energy or the second reservation information.

10. An apparatus comprising:
    a processor configured to obtain a first configuration designated to the apparatus, wherein the first configuration indicates at least one node-specific reservation signal configuration with at least one waveform for representing reservation information, the at least one node-specific reservation signal configuration specific to the first wireless communication device; and
    a transceiver configured to transmit a reservation signal to reserve a transmission opportunity (TXOP) in a shared spectrum, wherein the reservation signal includes a first waveform representing corresponding first reservation information based on the first configuration,
    wherein the first reservation information indicates at least one of a transmit power level of the reservation signal, an interference tolerance level of the apparatus, or a first resource allocated to the apparatus, and wherein the transceiver is further configured to transmit the reservation signal by transmitting the reservation signal using the first resource when the first reservation information indicates the first resource.

11. The apparatus of claim 10, wherein the first waveform is associated with a root sequence and a cyclic-shift value.

12. The apparatus of claim 10, wherein the transceiver is further configured to:
communicate, with a second wireless communication device, a reservation request (RRQ) signal, wherein the reservation signal is a reservation response (RRS) signal transmitted in response to the RRQ signal, wherein the shared spectrum is shared by a first network operating entity and a second network operating entity, and wherein the apparatus and the second wireless communication device are associated with the first network operating entity; and
communicate, with the second wireless communication device over the shared spectrum, data during the TXOP.

13. The apparatus of claim 12, wherein the first reservation information indicates a reserved duration within the TXOP, and wherein the transceiver is further configured to communicate the data by communicating the data during the reserved duration within the TXOP.

14. The apparatus of claim 12, wherein the transceiver is further configured to transmit another RRQ signal in another TXOP for communication with a third wireless communication device, and wherein the processor is further configured to:
obtain a second configuration designated to the third wireless communication device associated with the first network operating entity; and
monitor for an RRS signal from the third wireless communication device according to the second configuration.

15. The apparatus of claim 14, wherein the processor is further configured to refrain from communicating with the third wireless communication device over the shared spectrum during the another TXOP when there is no RRS signal detected from the third wireless communication device based on an energy threshold comparison.

16. The apparatus of claim 10, wherein the apparatus is associated with a first priority, and wherein the processor is further configured to:
obtain a second configuration designated to a second wireless communication device associated with a second priority higher than the first priority;
obtain a third configuration designated to a third wireless communication device associated with the second priority;
monitor for an RRS signal from the second wireless communication device reserving another TXOP in the shared spectrum according to the second configuration; and
monitor for an RRS signal from the third wireless communication device reserving the another TXOP in the shared spectrum according to the third configuration.

17. The apparatus of claim 16, wherein the second configuration indicates a second waveform and a second resource, wherein the third configuration indicates a third waveform and a third resource, and wherein at least one of:
the second resource is different from the third resource; or
the second waveform is different from the third waveform.

18. The apparatus of claim 17, wherein the second waveform represents second reservation information, wherein the third waveform represents third reservation information, and wherein the processor is further configured to:
determine that a first RRS energy of the RRS signal from the second wireless communication device reserving another TXOP is greater than a second RRS energy of the RRS signal from the third wireless communication device reserving the another TXOP; and
determine whether to yield access to the shared spectrum during the another TXOP or transmit data during the another TXOP based on at least one of the first RRS energy or the second reservation information.

19. A non-transitory computer-readable medium having program code recorded thereon, the program code comprising:
code for causing a first wireless communication device to obtain a first configuration designated to the first wireless communication device, wherein the first configuration indicates at least one node-specific reservation signal configuration with at least one waveform for representing reservation information, the at least one node-specific reservation signal configuration specific to the first wireless communication device; and
code for causing the first wireless communication device to transmit a reservation signal to reserve a transmission opportunity (TXOP) in a shared spectrum, wherein the reservation signal includes a first waveform representing corresponding first reservation information based on the first configuration,
wherein the first reservation information indicates at least one a transmit power level of the reservation signal, an interference tolerance level of the first wireless communication device, or a first resource allocated to the first wireless communication device, and wherein the code for causing the first wireless communication device to transmit the reservation signal is further configured to transmit the reservation signal using the first resource when the first reservation information indicates the first resource.

20. The non-transitory computer-readable medium of claim 19, wherein the first waveform is associated with a root sequence and a cyclic-shift value.

21. The non-transitory computer-readable medium of claim 19, further comprising:
code for causing the first wireless communication device to communicate, with a second wireless communication device, a reservation request (RRQ) signal, wherein the reservation signal is a reservation response (RRS) signal transmitted in response to the RRQ signal, wherein the shared spectrum is shared by a first network operating entity and a second network operating entity, and wherein the first wireless communication device and the second wireless communication device are associated with the first network operating entity; and
code for causing the first wireless communication device to communicate, with the second wireless communication device over the shared spectrum, data during the TXOP.

22. The non-transitory computer-readable medium of claim 21, wherein the first reservation information indicates a reserved duration within the TXOP, and wherein the code for causing the first wireless communication device to communicate the data is further configured to communicate the data during the reserved duration within the TXOP.

23. The non-transitory computer-readable medium of claim 21, further comprising:

code for causing the first wireless communication device to obtain a second configuration designated to a third wireless communication device associated with the first network operating entity;

code for causing the first wireless communication device to transmit another RRQ signal in another TXOP for communication with the third wireless communication device; and code for causing the first wireless communication device to monitor for an RRS signal from the third wireless communication device according to the second configuration.

24. The non-transitory computer-readable medium of claim 23, further comprising code for causing the first wireless communication device to refrain from communicating with the third wireless communication device over the shared spectrum during the another TXOP when there is no RRS signal detected from the third wireless communication device based on an energy threshold comparison.

25. The non-transitory computer-readable medium of claim 19, wherein the first wireless communication device is associated with a first priority, and wherein the computer-readable medium further comprises:

code for causing the first wireless communication device to obtain a second configuration designated to a second wireless communication device associated with a second priority higher than the first priority;

code for causing the first wireless communication device to obtain a third configuration designated to a third wireless communication device associated with the second priority;

code for causing the first wireless communication device to monitor for an RRS signal from the second wireless communication device reserving another TXOP in the shared spectrum according to the second configuration; and code for causing the first wireless communication device to monitor for an RRS signal from the third wireless communication device reserving the another TXOP in the shared spectrum according to the third configuration.

26. The non-transitory computer-readable medium of claim 25, wherein the second configuration indicates a second waveform and a second resource, wherein the third configuration indicates a third waveform and a third resource, and wherein at least one of:
the second resource is different from the third resource; or
the second waveform is different from the third waveform.

27. The non-transitory computer-readable medium of claim 26, wherein the second waveform represents second reservation information, wherein the third waveform represents third reservation information, and wherein the computer-readable medium further comprises:

code for causing the first wireless communication device to determine that a first RRS energy of the RRS signal from the second wireless communication device reserving another TXOP is greater than a second RRS energy of the RRS signal from the third wireless communication device reserving the another TXOP; and code for causing the first wireless communication device to determine whether to yield access to the shared spectrum during the another TXOP or transmit data during the another TXOP based on at least one of the first RRS energy or the second reservation information.

* * * * *